(12) United States Patent
Nagashima

(10) Patent No.: US 10,767,483 B2
(45) Date of Patent: Sep. 8, 2020

(54) POWER GENERATION SYSTEM AND ELECTRICITY GENERATION SYSTEM USING THE POWER GENERATION SYSTEM

(71) Applicant: Kazuhiko Nagashima, Fukuoka (JP)

(72) Inventor: Kazuhiko Nagashima, Fukuoka (JP)

( * ) Notice: Subject to any disclaimer, the term of this patent is extended or adjusted under 35 U.S.C. 154(b) by 0 days.

(21) Appl. No.: 16/648,067

(22) PCT Filed: Mar. 12, 2018

(86) PCT No.: PCT/JP2018/009461
§ 371 (c)(1),
(2) Date: Mar. 17, 2020

(87) PCT Pub. No.: WO2019/077774
PCT Pub. Date: Apr. 25, 2019

(65) Prior Publication Data
US 2020/0232324 A1 Jul. 23, 2020

(30) Foreign Application Priority Data

Oct. 20, 2017 (JP) .................. 2017-203335

(51) Int. Cl.
*F01B 15/02* (2006.01)
*F02B 41/00* (2006.01)
(Continued)

(52) U.S. Cl.
CPC ............ *F01B 11/003* (2013.01); *F01B 29/10* (2013.01); *F01K 25/02* (2013.01)

(58) Field of Classification Search
CPC .. F01K 7/36; F01K 23/06; F01B 15/02; F02B 71/04; F02B 41/00; F02B 63/04
See application file for complete search history.

(56) References Cited

U.S. PATENT DOCUMENTS

| 4,359,118 A | 11/1982 | Latter et al. |
| 4,747,271 A | 5/1988 | Fischer |
(Continued)

FOREIGN PATENT DOCUMENTS

| JP | S57-068507 A | 4/1982 |
| JP | S57-137661 A | 8/1982 |
(Continued)

OTHER PUBLICATIONS

International Search Report dated Apr. 17, 2018 for PCT/JP2018/009461 and English translation.

*Primary Examiner* — Long T Tran
(74) *Attorney, Agent, or Firm* — Lucas & Mercanti, LLP

(57) ABSTRACT

Provided is a power generation system with which it is possible to perform efficient power generation. The power generation system comprises: an evaporation chamber; a reciprocal heat-insulating cylinder provided with a forward-side expansion chamber and a backward-side expansion chamber; an operating fluid supply/ejection means which performs a supply flow passageway forming operation and an ejection flow passageway forming operation in an alternating and reciprocal manner; a heat-insulating expansion chamber; a liquefied operating fluid recirculating means; and a compression/liquefaction recirculating means. The heat-insulating expansion chamber may be provided separately on both the ejection flow passage downstream side of the forward-side expansion chamber and on the ejection flow passage downstream side of the backward-side expansion chamber.

20 Claims, 7 Drawing Sheets

(51) Int. Cl.
*F01K 23/06* (2006.01)
*F01B 11/00* (2006.01)
*F01K 25/02* (2006.01)
*F01B 29/10* (2006.01)

(56) References Cited

U.S. PATENT DOCUMENTS

| | | | |
|---|---|---|---|
| 5,209,065 A | 5/1993 | Sakata | |
| 5,839,270 A * | 11/1998 | Jirnov | F01C 1/3441 |
| | | | 60/775 |
| 6,186,126 B1 * | 2/2001 | Gray, Jr. | F02B 43/08 |
| | | | 123/557 |
| 2004/0103637 A1 * | 6/2004 | Maisotsenko | F01K 21/047 |
| | | | 60/39.59 |
| 2007/0119175 A1 * | 5/2007 | Ruggieri | F03G 6/065 |
| | | | 60/649 |
| 2008/0264062 A1 * | 10/2008 | Prueitt | F01K 27/00 |
| | | | 60/670 |
| 2012/0297772 A1 * | 11/2012 | McBride | F01K 25/06 |
| | | | 60/649 |
| 2013/0233288 A1 * | 9/2013 | Schnepel | F02G 3/02 |
| | | | 123/528 |
| 2013/0236370 A1 * | 9/2013 | Maslov | F02C 6/12 |
| | | | 422/198 |
| 2015/0007568 A1 * | 1/2015 | Chaen | F01K 7/165 |
| | | | 60/645 |
| 2019/0234341 A1 * | 8/2019 | Maisotsenko | F02G 1/02 |

FOREIGN PATENT DOCUMENTS

| | | |
|---|---|---|
| JP | S61-002770 B2 | 8/1982 |
| JP | H04-017703 A | 1/1992 |
| JP | 2001152813 A | 6/2001 |
| JP | 2001221015 A | 8/2001 |
| JP | 2011256856 A | 12/2011 |
| JP | 2013040606 A | 2/2013 |

* cited by examiner

POWER GENERATION SYSTEM AND ELECTRICITY GENERATION SYSTEM USING THE POWER GENERATION SYSTEM

CROSS REFERENCE TO RELATED APPLICATION

This Application is a 371 of PCT/JP2018/009461 filed on Mar. 12, 2018 which, in turn, claimed the priority of Japanese Patent Application No. 2017-203335 filed on Oct. 20, 2017, both applications are incorporated herein by reference.

TECHNICAL FIELD

The present invention relates to a power generation system and an electricity generation system using the power generation system.

BACKGROUND ART

A big earthquake occurring in Mar. 11, 2011 notified threat of nuclear power in the whole world and global warming occurring by using fossil fuel is making major impact not only for human race but also for whole organism living on the earth. For human race, it now becomes urgent development of clean and safe earth-friendly renewable energy As a representative energy recover method by heat engine, for example, it is raised thermal power generation and nuclear power generation. In these power generation, high temperature and pressure water vapor is produced by thermal power or nuclear power and turbine is rotated by water vapor, thereby electricity is generated. Although, in the above method, thermal energy is once converted to kinetic energy and work is done, thereby kinetic energy is recovered as electric energy, entropy is increased when internal energy is released from a physically restrained system and converted to kinetic energy, thus it is difficult to increase recovery efficiency of thermal energy by conventional technology. In normal thermal power generation or nuclear power generation, recovery efficiency is only to an extent of 30%-40% of thermal energy.

Further, as the other energy recovery methods, it is well known a method to generate electricity by recovering renewable energy. For example, it is conventionally known ocean thermal energy conversion and solar thermal power.

However, in these power generation methods, recovery efficiency of thermal energy is worse in comparison with thermal power generation or nuclear power generation and big energy loss occurs in supply of seawater of low temperature and low vapor pressure and both high heat source and low heat source and substantial recovery efficiency becomes fairly low. Therefore, it is hard to say that the above power generation methods can be replaced with thermal power generation or nuclear power generation. Further, there is also problem that electric-generating capacity is easily influenced by natural environment such as weather conditions.

Accordingly, the present inventor proposed in the past a system in which latent heat of vaporization of operating fluid is adsorbed from heat source with normal temperature, thermal energy is converted to kinetic energy during such process and efficiently recovered, the operating fluid after work is cooled down while being pressurized, thereby the thermal energy becomes to be easily released to the normal temperature, and according to the above method, liquefaction latent heat is released to the normal temperature and thereby cycles go around (see Patent Literature 1).

Further, according to the above system, the thermal energy can be stably recovered without being influenced by the natural environment such as, for example, wind-power generation or solar power generation and further power generation can be efficiently conducted by utilizing such thermal energy.

CITATION LIST

Patent Literature

PLT1: Japanese Patent Application Laid Open No. 2013-040606

SUMMARY OF INVENTION

Technical Problem

The system proposed in the past by the present inventor is an extremely good system at a point that, as described in each embodiment of the above Patent Literature 1, normal temperature water obtained from sea or river and the like or normal temperature air from atmosphere as heat source is converted to kinetic anergy and electricity generation can be conducted by utilizing this kinetic energy.

However, room for improvement is still remained in the above excellent system at a viewpoint of efficiency.

The present invention has been done in accordance with the above situation and the present invention provides a power generation system in which power generation can be more efficiently conducted in comparison with the conventional system. The present invention also provided an electricity generation system using the power generation system.

Solution to Problem

To solve the above conventional problem, in a power generation system according to the present invention,
(1) A power generation system for generating power by circulating operating fluid within a system of pressure-resistant closed circuit while changing state of the operating fluid and converting foreign heat energy given to the operating fluid into kinetic energy,
wherein the pressure-resistant closed circuit comprising:
an evaporation chamber in which gas phase and liquid phase of the operating fluid are stored at a temperature near a boiling point and which is constituted so as to be capable of heat exchange between heating fluid supplied from outside a system of the pressure-resistant closed circuit and liquid phase of the operating fluid;
a reciprocal heat-insulating cylinder having a piston moving by pressure difference between a forward-side expansion room and a backward-side expansion room and a rod extended from the piston, the rod outputting power;
operating fluid supply and discharge means for conducting supply channel forming operation to form a channel for supplying the operating fluid in the gas phase portion in the evaporation chamber to one of expansion rooms of the reciprocal heat-insulating cylinder and discharge channel forming operation to form a discharge channel of the operating fluid from another expansion room, further for alternately conducting the supply channel forming operation and the discharge channel forming operation against the forward-side expansion room and the backward-side expansion room;

a heat-insulating expansion chamber for liquefying the operating fluid discharged from the another expansion room by temperature decrease according to adiabatic expansion; and a liquefied operating fluid reflux means for refluxing the operating fluid liquefied in the heat-insulating expansion chamber to the evaporation chamber.

Further, the power generation system according to the present invention is characterized in the following points.

(2) The power generation system has compression liquefaction reflux means for compressing and liquefying remainder of the operating fluid not liquefied in the heat-insulating expansion chamber and refluxing the operating fluid to the evaporation chamber.

(3) The heat-insulating expansion is independently provided for each of both a downstream side of the discharge channel of the forward-side expansion room and a downstream side of the discharge channel of the backward-side expansion room.

(4) In the power generation system, an operating fluid channel communicating the gas phase portion of each heat-insulating expansion chamber and the compression liquefaction reflux means penetrates in the another heat-insulating expansion chamber and it is provided a heat exchange unit to promote liquefaction of the operating fluid discharged from the expansion room is respectively provided on the penetrated operating fluid channel.

(5) In the power generation system, the pressure resistant closed circuit further has an on-off valve provided on halfway of the operating fluid channel communicating the gas phase portion of the heat-insulating expansion chamber and the compression liquefaction reflux means, and the operating fluid supply discharge means conducts decompression sending operation in which the supply and discharge channel of the operating fluid to the expansion room is temporarily closed at a change time of reciprocal motion of the rod and the operating fluid is introduced to the compression liquefaction reflux means while the on-off valve is opened and a temperature is decreased by further adiabatically expanding the gas phase portion in the heat-insulating expansion chamber.

(6) In the power generation system, the operating fluid is gas under normal temperature and pressure and a cold or freezer facility using the operating fluid as refrigerant is provided between the on-off valve and the compression liquefaction reflux means.

(7) In the power generation system, the pressure-resistant closed circuit has a condenser condensing the operating fluid by conducting heat exchange with cooling fluid supplied from outside a system of the pressure-resistant closed circuit, the condenser being provided on halfway of the operating fluid channel communicating the compression liquefaction reflux means and the evaporation chamber.

(8) In the power generation system, the cooling fluid is the heating fluid after heat exchange is conducted in the evaporation chamber.

(9) In the pressure-resistant closed circuit of the power generation system, a plurality of warming heat exchangers warming the operating fluid by conducting heat exchange with warming fluid supplied from outside a system of the pressure-resistant closed circuit are provided in series, the warming heat exchanger being provided on halfway of the operating fluid channel communicating the compression liquefaction reflux means and the evaporation chamber.

(10) In the pressure-resistant closed circuit of the power generation system, a plurality of warming heat exchangers warming the operating fluid by conducting heat exchange with the warming fluid supplied from outside a system of the pressure-resistant closed circuit are provided in series, the warming heat exchanger being provided on halfway of the operating fluid channel communicating the compression liquefaction reflux means and the evaporation chamber, and the warming fluid supplied in the heat exchanger of last stage among the heat exchangers provided in series is the cooling fluid after heat exchange is conducted in the condenser.

(11) In the power generation system, the operating fluid condensed in the condenser is joined with the liquefied operating fluid refluxed to the evaporation chamber through the liquefied operating fluid reflux means on halfway of the operating fluid channel arranged upstream side than the heating heat exchanger and downstream side than the liquefied operating fluid reflux means.

(12) In the pressure-resistant closed circuit of the power generation system, a plurality of warming heat exchangers warming the operating fluid by conducting heat exchange with the warming fluid supplied from outside a system of the pressure-resistant closed circuit are provided in series, the warmingheat exchanger being provided on halfway of the operating fluid channel communicating the compression liquefaction reflux means and the evaporation chamber, and discharged liquid of the warming fluid supplied in the heat exchanger of first stage among the heat exchangers provided in series is supplied to the condenser as the cooling fluid.

(13) In the power generation system, the warming fluid supplied to the heat exchanger of last stage among the heat exchangers provided in series is a part of the heating fluid inflowing therein, to conduct heat exchange with liquid phase of the operating fluid in the evaporation chamber.

(14) In the heat-insulating expansion chamber of the power generation system, an auxiliary heat exchanger assisting liquefaction of the operating fluid is arranged at a position contactable with the operating fluid introduced from the another expansion room, and the operating fluid diverted from halfway of the operating fluid channel communicating the evaporation chamber and the reciprocal heat-insulating cylinder is introduced in the auxiliary heat exchanger through a pressure reducing valve and the operating fluid introduced in the heat-insulating expansion chamber from the reciprocal heat-insulating cylinder is cooled and liquefaction is assisted, and the operating fluid discharged from auxiliary heat exchanger is compressed and condensed by the compression liquefaction reflux means and the operating fluid is refluxed to the evaporation chamber.

Further, in the power generation system according to the present invention, (15) an electricity generation system using the power generation system described in any one of claims (1) to (14), wherein
the rod extended from the piston is connected so that power becomes transmittable to a passive part of a generator.

Further, to solve the above conventional problem, in a power generation system according to the present invention, (16) A power generation system for generating power by circulating operating fluid within a system of pressure-resistant closed circuit while changing state of the operating fluid and converting foreign heat energy given to the operating fluid into kinetic energy, wherein the pressure-resistant closed circuit comprising:
an evaporation chamber in which gas phase and liquid phase of the operating fluid are stored at a temperature near a boiling point and which is constituted so as to be capable of heat exchange between heating fluid supplied from outside a system of the pressure-resistant closed circuit and the liquid phase of the operating fluid;

a heat-insulating expansion chamber liquefying the operating fluid supplied from the evaporation chamber by temperature decrease according to adiabatic expansion;

a turbine rotating by contacting with the operating fluid flowing based on pressure difference between pressure of the evaporation chamber side and pressure of the heat-insulating expansion chamber side within a turbine room arranged on halfway of an operating fluid channel communicating the evaporation chamber and the heat-insulating expansion chamber;

an energy transmission mechanism having a rod extended from the turbine and outputting power;

a liquefied operating fluid reflux means for refluxing the operating fluid liquefied in the heat-insulating expansion chamber to the evaporation chamber; and an auxiliary heat exchanger assisting liquefaction of the operating fluid, the auxiliary heat exchanger being arranged at a position contactable with the operating fluid introduced from the turbine room;

wherein the operating fluid diverted from halfway of the operating fluid channel communicating the evaporation chamber and the turbine room is introduced in the auxiliary heat exchanger through a pressure reducing valve and the operating fluid introduced in the heat-insulating expansion chamber from the turbine room is cooled and liquefaction is assisted, and wherein the operating fluid discharged from the auxiliary heat exchanger is compressed and condensed by the compression liquefaction reflux means and the operating fluid is refluxed to the evaporation chamber.

Further, the above mentioned power generation system according to the present invention is characterized in the following points.

(17) The pressure-resistant closed circuit has a condenser condensing the operating fluid by conducting heat exchange with cooling fluid supplied from outside a system of the pressure-resistant closed circuit, the condenser being provided on halfway of the operating fluid channel communicating the compression liquefaction reflux means and the evaporation chamber.

(18) In the pressure-resistant closed circuit a plurality of warming heat exchangers warming the operating fluid by conducting heat exchange with warming fluid supplied from outside a system of the pressure-resistant closed circuit are provided in series, the warming heat exchanger being provided on halfway of the operating fluid channel communicating the compression liquefaction reflux means and the evaporation chamber, and discharged liquid of the warming fluid supplied in the heat exchanger of first stage among the heat exchangers provided in series is supplied to the condenser as the cooling fluid.

(19) The warming fluid supplied to the heat exchanger of last stage among the heat exchangers provided in series is a part of the warming fluid inflowing therein, to conduct heat exchange with liquid phase of the operating fluid in the evaporation chamber.

Further, in the power generation system according to the present invention, (20) An electricity generation system using the power generation system described in any one of (16) to (19), the rod extended from the piston is connected so that power becomes transmittable to a passive part of a generator.

Advantageous Effects of Invention

According to the present invention, it is provided a power generation system for generating power by circulating operating fluid within a system of pressure-resistant closed circuit while changing state of the operating fluid and converting foreign heat energy given to the operating fluid into kinetic energy, wherein the pressure-resistant closed circuit comprising:

an evaporation chamber in which gas phase and liquid phase of the operating fluid are stored at a temperature near a boiling point and which is constituted so as to be capable of heat exchange between heating fluid supplied from outside a system of the pressure-resistant closed circuit and the liquid phase of the operating fluid;

a reciprocal heat-insulating cylinder having a piston moving by pressure difference between a forward-side expansion room and a backward-side expansion room and a rod extended from the piston, the rod outputting power;

operating fluid supply and discharge means for conducting supply channel forming operation to form a channel for supplying the operating fluid in the gas phase portion in the evaporation chamber to one of expansion rooms of the reciprocal heat-insulating cylinder and discharge channel forming operation to form a discharge channel of the operating fluid from another expansion room, further for alternately conducting the supply channel forming operation and the discharge channel forming operation against the forward-side expansion room and the backward-side expansion room;

a heat-insulating expansion chamber for liquefying the operating fluid discharged from the another expansion room by temperature decrease according to adiabatic expansion; and a liquefied operating fluid reflux means for refluxing the operating fluid liquefied in the heat-insulating expansion chamber to the evaporation chamber, and further it is provided a power generation system for generating power by circulating operating fluid within a system of pressure-resistant closed circuit while changing state of the operating fluid and converting foreign heat energy given to the operating fluid into kinetic energy, further, in a power generation system for generating power by circulating operating fluid within a system of pressure-resistant closed circuit while changing state of the operating fluid and converting foreign heat energy given to the operating fluid into kinetic energy, wherein the pressure-resistant closed circuit comprising:

an evaporation chamber in which gas phase and liquid phase of the operating fluid are stored at a temperature near a boiling point and which is constituted so as to be capable of heat exchange between heating fluid supplied from outside a system of the pressure-resistant closed circuit and gas phase of the operating fluid;

a heat-insulating expansion chamber liquefying the operating fluid supplied from the evaporation chamber by temperature decrease according to adiabatic expansion;

a turbine rotating by contacting with the operating fluid flowing based on pressure difference between pressure of the evaporation chamber side and pressure of the heat-insulating expansion chamber side within a turbine room arranged on halfway of an operating fluid channel communicating the evaporation chamber and the heat-insulating expansion chamber;

an energy transmission mechanism having a rod extended from the turbine and outputting power;

a liquefied operating fluid reflux means for refluxing the operating fluid liquefied in the heat-insulating expansion chamber to the evaporation chamber; and an auxiliary heat exchanger assisting liquefaction of the operating fluid, the auxiliary heat exchanger being arranged at a position contactable with the operating fluid introduced from the turbine room;

wherein the operating fluid diverted from halfway of the operating fluid channel communicating the evaporation chamber and the turbine room is introduced in the auxiliary heat exchanger through a pressure reducing valve and the operating fluid introduced in the heat-insulating expansion chamber from the turbine room is cooled and liquefaction is assisted, and wherein the operating fluid discharged from the auxiliary heat exchanger is compressed and condensed by the compression liquefaction reflux means and the operating fluid is refluxed to the evaporation chamber. Therefore, it can be provided the power generation system though which more efficient electricity generation can be conducted in comparison with the conventional technology.

Further, in the power generation system according to the present invention, the rod extended from the piston or turbine is connected so that power becomes transmittable to a passive part of a generator. Therefore, more efficient electricity generation can be conducted in comparison with the conventional technology

DESCRIPTION OF EMBODIMENTS

Figure 1:
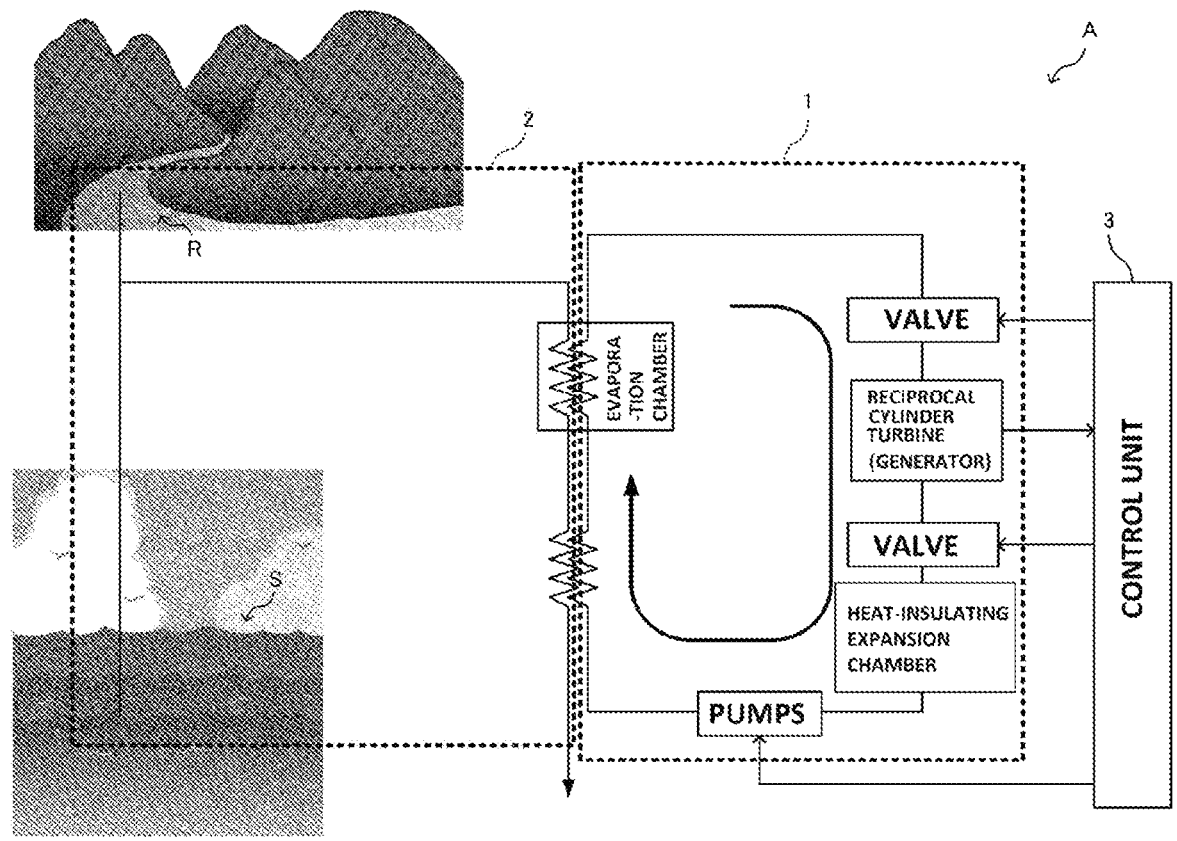
FIG. 1 is a schematic view of the electricity generation system according to the present embodiment.

The present invention concerns the power generation system in which the foreign heat energy given to the operating fluid by circulating the operating fluid while changing state thereof such as liquid or gas within the pressure-resistant closed circuit is converted into kinetic energy and which generates power and the electricity generation system (hereinafter, called as present system) generating electricity by driving the generator through this power (kinetic energy). It has an object to provide the power generation system and the electricity generation system through which more efficient electricity generation can be conducted in comparison with the conventional technology.

In the present system, the operating fluid circulated in the pressure-resistant closed circuit is not especially limited. Generally, it can be used substance utilized as refrigerant, concretely, it can be suitably used substance being rich in chemical stability, being gas under normal pressure and temperature and having property with easy liquefaction. Dare exemplifying the operating fluid, propane, butane, freon, ammonia can be raised.

Further, energy magnitude of the foreign heat energy is not especially limited, however it is necessary temperature difference to an extent that heat can be given to gas phase of the operating fluid stored in the evaporation chamber mentioned later.

A state of the supply medium for the foreign heat energy, that is, individual distinction of gas, liquid or solid is not especially limited, however, in many cases, liquid or gas having fluidity is advantageous. As such supply medium of the foreign heat energy, for example, it is possible to select water of sea, river, dam or air in atmosphere.

The present system, in which the operating fluid having foreign heat energy supplied from such supply medium is circulated, thereby power is generated and electricity power generation is conducted, possesses in the pressure-resistant closed circuit the evaporation chamber, the reciprocal heat-insulating cylinder, the operating fluid supply discharge means, the heat-insulation expansion chamber, liquefaction operating fluid reflux means and the compression liquefaction reflux means, thereby, constitution of the present system is realized. Here, the present application also provides a pressure resistant closed circuit structure for the power generation system capable of more efficient electricity generation in comparison with the conventional technology.

The evaporation chamber is constituted so that the operating fluid with a temperature near a boiling point is stored in a pressure vessel having an insulated structure, the operating fluid being stored with gas phase and liquid phase in gas-liquid equilibrium. Ratio of the gas phase capacity and the liquid phase capacity in the evaporation chamber is influenced by kind of the used operating fluid and temperature of supply medium and the like, however, it is generally preferable that gas phase:liquid phase=10 capacity parts: 1 capacity part~5 capacity parts: 1 capacity part.

Further, the evaporation chamber is constituted so that heat exchange can be conducted between the heating fluid supplied from outside of the system of the pressure-resistant closed circuit, that is, the above mentioned foreign heat energy supply medium and the liquid phase of the operating fluid, thereby heat energy corresponding to temperature difference possessed by the foreign heat energy supply medium beyond the operating fluid can be given to the operating fluid. In addition, the evaporation chamber in the present system is the most important portion among portions becoming entrance of the foreign heat energy.

As the operating fluid within the evaporation chamber, for example, the heating fluid such as seawater a temperature of which is comparatively constantly maintained is always communicated, thereby in a case that pressure change of the gas phase within the evaporation chamber does not occur, it will become a state that temperature equilibrium between the heating fluid and the operating fluid and gas-liquid equilibrium (in a case that heat loss is ignored) between the gas phase and the liquid phase of the operating fluid are substantially retained.

On the other hand, based on that the operating fluid supply discharge means mentioned later functions, in a case that gas phase pressure in the evaporation chamber is decreased, the operating fluid of liquid phase evaporates and gas pressure is compensated so as to become gas-liquid equilibrium and energy corresponding to temperature decreased corresponding to evaporation of liquid phase is given from the supply medium through heat exchange.

That is, although some temperature change and pressure change occurs, as mentioned later, even if capacity is expanded corresponding to volume of the expansion room in the reciprocal heat-insulating cylinder, it is constituted so that temperature equilibrium of the supply medium and liquid phase of the operating fluid and gas-liquid equilibrium in the evaporation chamber are maintained as much as possible.

Here, as one example, in a case that seawater of 20~30° C. (for example 25° C.) is adopted as the foreign heat energy supply medium and propane is adopted as the operating fluid (hereinafter, called as propane condition), liquid phase temperature of the operating fluid in the evaporation chamber can be made 20~30° C. (for example, 25° C.) and gas phase pressure can be made 7~9.5 atm (for example, 8.2 atm).

The reciprocal heat-insulating cylinder is a cylinder with insulated structure capable of reciprocally moving and is a part to obtain kinetic energy by being driven through the gas phase operating fluid supplied from the evaporation chamber.

The reciprocal cylinder may be a cylinder of a so-called double rod cylinder having two air rooms in one mechanical parts and it may be constituted that two of so-called single rod cylinder having one air room in one mechanical parts are combined and the rods are connected. In the former, each air room respectively corresponds to the forward-side expansion room and the backward-side expansion room and in the latter, the air room in one of the single rod cylinders functions as the forward-side expansion room and the air room of the other of the single rod cylinders functions as the backward-side expansion room.

That is, the reciprocal heat-insulating cylinder has the piston moving by pressure difference between the forward-side expansion room and the backward-side expansion room and the rod extended from the piston.

When the gas phase operating fluid is supplied to the forward-side expansion room, the piston moves by its pressure, the forward-side expansion room expands and the backward-side expansion room shrinks, thereby the operating fluid stored in the backward-side expansion room is discharged from the reciprocal heat-insulating cylinder. Vice versa, similarly, when the gas phase operating fluid of the evaporation chamber is supplied to the backward-side expansion room, the piston moves by its pressure, the backward-side expansion room expands and the forward-side room shrinks, thereby the operation fluid stored in the forward-side-expansion room is discharged.

Further, the rod extended from the piston functions as output part of power. Based on that the rod is connected to the passive part of the generator so that power can be transmitted, the electricity generation system according to the present embodiment is made the electricity generation system, thereby electricity power can be obtained. As for connection of the rod and the passive part of the generator, movement of the rod which retreats may be directly transmitted to the passive part of the generator through, for example, mechanism such as rack and pinion and the like and such movement of the rod may be indirectly transmitted through a predetermined gear box and the like. Here, a part of electricity power occurring by electricity generation may be used as electricity power necessary to drive the present system.

As one example of the operating fluid, in case of the propane condition previously mentioned, gas phase propane with 7~9.5 atm (for example, 8.2 atm) moves the piston along a cylinder between an outbound dead point and a return dead point.

Further, although capacity of each expansion room is influenced by kind of the operating fluid which is used and temperature of the supply medium and the like, it is desirable that capacity thereof lies within a range of 1~2 capacity % comparing with capacity of gas phase portion in the evaporation chamber.

The operating fluid supply discharge means conducts supply channel forming operation for forming a channel to supply the operating fluid in the gas phase portion of the evaporation chamber to one expansion room of the reciprocal heat-insulating cylinder and discharge channel forming operation for forming a discharge channel of the operating fluid from the another expansion room.

Between the expansion chamber and the heat-insulating reciprocal cylinder, it is provided supply channel switching means such as valve for introducing the gas phase operating fluid from the evaporation chamber to either one of the forward-side expansion room and the backward-side expansion room of the heat-insulating reciprocal cylinder and the operating fluid supply discharge means realizes the supply channel forming operation by switching control of the supply channel switching means. Here, the supply channel switching means may be a three-way valve and may be constituted by using two valves.

Further, between the heat-insulating reciprocal cylinder and a heat-insulating expansion chamber mentioned later, it is provided two channels of a forward channel expansion room discharge channel communicating the forward channel expansion room and the heat-insulating expansion chamber and a backward channel expansion room discharge channel communicating the backward channel expansion room and the heat-insulating expansion chamber. Further, it is provided discharge channel switching means such as valve for switching open state and closed state in each channel.

Further, the operating fluid supply discharge means realized discharge channel forming operation by conducting switching control of the discharge channel switching means.

Further, when the operating fluid supply discharge means conducts, for example, supply channel forming operation to introduce the gas phase operation fluid to the forward channel expansion room, the discharge channel switching means of the forward channel expansion discharge channel is made closed state and the discharge channel switching means of the backward channel expansion room discharge channel is made open state, thereby it is conducted the discharge channel forming to the heat-insulating expansion chamber of the operating fluid existing in the backward expansion room. Here, in the following explanation, the operation in which the forward expansion room is expanded by switching state of each switching means as mentioned in the above and the piston and rod are moved is called as forward operation.

On the other hand, for example, when the supply channel forming operation to introduce the gas phase operating fluid to the backward channel expansion room is conducted, the discharge channel switching means of the backward expansion room discharge channel is made closed state and the discharge channel switching means if the forward expansion discharge channel is made open state, thereby it is conduced the discharge channel forming to the heat-insulating expansion chamber of the operating fluid existing in the forward expansion room. Here, in the following explanation, the operation in which the backward expansion room is expanded by switching state of each switching means as mentioned in the above and the piston and rod are moved is called as backward operation Further, the operating fluid supply discharge means alternately conducts such supply channel forming operation and discharge channel forming operation against the forward-side expansion room and the backward-side expansion room, thereby based on pressure which the gas phase operating fluid in the evaporation chamber has, power formation and driving of the generator by driving the heat-insulating reciprocal cylinder are realized corresponding to that the forward operation and the backward operation are repeated.

The heat-insulating expansion chamber is a part that most of the operating fluid discharged through each expansion room discharge channel from the forward expansion room or the backward expansion room of the heat-insulating reciprocal cylinder is liquefied by temperature decrease according to adiabatic expansion.

That is, the heat-insulating expansion chamber has lower pressure than inner pressure of the expansion room under a state that the piston of the heat-insulating reciprocal cylinder reaches any one dead point of forward movement or backward movement, and such pressure difference is the pressure difference to the extent that the gas phase operating fluid can be liquefied by adiabatic expansion.

For example, under the propane condition previously mentioned, it is constituted so that temperature of the operating fluid stored in the heat-insulating expansion chamber approximately becomes −42~−10° C. (for example, −10° C.) and gas phase pressure approximately becomes 1.7~2.5 atm (for example, 2 atm), thereby the operating fluid discharged from each expansion room is liquefied.

Further especially, it is characterized at a point that the heat-insulating expansion chamber in the present system is independently provided to each of both the discharge channel downstream side of the forward-side expansion room and the discharge channel downstream side of the backward-side expansion room.

Based on the above constitution, the operating fluid discharged from the heat-insulating reciprocal cylinder can be received with enough pressure difference under an independent state by the expansion room and can be liquefied, thereby power can be efficiently generated and electricity generation can be efficiently conducted in comparison with the conventional case, without interfering movement of the reciprocal heat-insulating cylinder.

Further, in the vicinity of outlet of the operating fluid inflowing in the heat-insulating expansion chamber from each of the expansion rooms discharge channels, separate turbine for electricity power generation and the like can be provided. Based on such constitution, electricity power generation can be further conducted.

Here, although capacity of each heat-insulating expansion chamber is influenced by kind of the used operating fluid and temperature of the supply medium and the like, generally, it is desirable that capacity of each heat-insulating expansion chamber lies in a range of 4.5~9 magnification against the maximum capacity of each expansion chamber (capacity when the piston reaches dead point). Further, it is desirable that ratio of gas phase capacity and liquid phase capacity in the heat-insulating expansion chamber lies in a range of gas phase:liquid phase=250:1~250:2.

The liquefaction operating fluid reflux means refluxes the operating fluid in the heat-insulating expansion chamber to the evaporation chamber.

The liquefaction operating fluid reflux means refluxes liquid phase of the operating fluid in the heat-insulating expansion chamber and liquid phase of the operating fluid in the buffer tank storing liquid phase flowing down from the heat-insulating expansion chamber against pressure difference with the evaporation chamber. As the liquefaction operating fluid reflux means, a liquid pump with excellent liquid tightness and pressure resistance can be adopted.

For example, under the above mentioned propane condition, the operating fluid liquefied resisting pressure gradient between the about 1.7~2.5 atm in the heat-insulating expansion chamber and the buffer tank and about 7~9.5 atm in the evaporation chamber is sent to the evaporation chamber. Here, in a case that the buffer tank is provided between the heat-insulating expansion chamber and the operating fluid reflux means, it may be good that capacity of the buffer tank is capacity capable of accepting 1~several times of whole capacity of liquid phase produced in the heat-insulating expansion chamber.

The compression liquefaction reflux means compresses and liquefies remainder of the operating fluid not liquefied in the heat-insulating expansion chamber and refluxes to the evaporation chamber.

The compression liquefaction reflux means is provided on halfway of the operating fluid channel communicating the gas phase portion of the heat-insulating expansion chamber and the evaporation chamber, compresses and liquefies the gas phase operating fluid and refluxes the liquefied operating fluid resisting the pressure difference between the heat-insulating chamber and the evaporation chamber.

Further, according to the present system having above constitution, power can be more efficiently generated and thus electricity generation can be conducted, in comparison with the electricity power generation system previously proposed by the present inventor.

Further, in the present system, in addition to the above basic system, further constitution can be added.

For example, it may be conceivable in the power generation system, the pressure resistant closed circuit further has an on-off valve provided on halfway of the operating fluid channel communicating the gas phase portion of the heat-insulating expansion chamber and the compression liquefaction reflux means, and the operating fluid supply discharge means conducts decompression sending operation in which the supply and discharge channel of the operating fluid to the expansion room is temporarily closed at a change time of reciprocal motion of the rod and the operating fluid is introduced to the compression liquefaction reflux means while the on-off valve is opened and a temperature is decreased by further adiabatically expanding the gas phase portion in the heat-insulating expansion chamber.

According the above constitution, pressure control of the heat-insulating expansion chamber can be made more firmly, thereby liquefaction of the operating fluid can be efficiently realized.

Further, it may be conceivable that in the power generation system, the operating fluid is gas under normal temperature and pressure and a cold or freezer facility using the operating fluid as refrigerant is provided between the on-off valve and the compression liquefaction reflux means.

According the above construction, electricity power supply can, of course, be done and supply of cold heat can be done, thus the power generation system and the electricity generation system extremely rich in versatility can be provided. Here, in a case that the heat-insulating chamber is provided on both the forward side and the backward side, it may be conceivable that the freezer facility and the cold facility may be respectively provided in both the operating fluid channels leading to each compression liquefaction reflux means from each heat-insulating expansion chamber or may be provided in only one thereof.

Further, it may be conceivable that, in the power generation system, the pressure-resistant closed circuit has a condenser condensing the operating fluid by conducting heat exchange with cooling fluid supplied from outside a system of the pressure-resistant closed circuit, the condenser being provided on halfway of the operating fluid channel communicating the compression liquefaction reflux means and the evaporation chamber. According to the above constitution, efficient liquefaction of the operating fluid can be realized.

Further, it may be conceivable that, in the power generation system, the cooling fluid is the heating fluid after heat exchange is conducted in the evaporation chamber. According to the above constitution, it can be condensed the operating fluid compressed through the heating fluid after heat exchange in the evaporation chamber, that is, the supply medium temperature of which is decreased based on that heat as the foreign heat energy is deprived in the evaporation chamber, thereby liquefaction of the operating fluid can be efficiently done.

It may be conceivable that, in the pressure-resistant closed circuit of the power generation system, a plurality of warming heat exchangers warming the operating fluid by conducting heat exchange with warming fluid supplied from outside a system of the pressure-resistant closed circuit are provided in series, the warming heat exchanger being provided on halfway of the operating fluid channel communicating the compression liquefaction reflux means and the evaporation chamber.

According to the above constitution, liquid operating fluid cooled by liquefaction through adiabatic expansion can be, of course, warmed and refluxed to the evaporation chamber and the warming fluid cooled by heat exchange can be separately utilized as cold heat source.

Further, it may be conceivable that the warming fluid supplied in the heat exchanger of last stage among the warming heat exchangers in series is the cooling fluid after heat exchange is conducted in the condenser.

According to the above constitution, a part of energy consumed so that the compression liquefaction reflux means liquefies the operating fluid can be recovered, thereby efficiency as the power generation system and the electricity generation system can be further raised.

Further, it may be conceivable that the operating fluid channel communicating the gas phase portion of each heat-insulating expansion chamber and the compression liquefaction reflux means penetrates another heat-insulating expansion chamber and it may be respectively provided the heat exchanger portion to promote liquefaction of the operating fluid discharged from the expansion room in the operating fluid channel portion which is penetrated. According to the above constitution, liquefaction efficiency of the operating fluid in the heat-insulating expansion chamber can be further improved.

It may be conceivable that in a power generation system for generating power by circulating operating fluid within a system of pressure-resistant closed circuit while changing state of the operating fluid and converting foreign heat energy given to the operating fluid into kinetic energy, wherein the pressure-resistant closed circuit comprising:

an evaporation chamber in which gas phase and liquid phase of the operating fluid are stored at a temperature near a boiling point and which is constituted so as to be capable of heat exchange between heating fluid supplied from outside a system of the pressure-resistant closed circuit and gas phase of the operating fluid;

a heat-insulating expansion chamber liquefying the operating fluid supplied from the evaporation chamber by temperature decrease according to adiabatic expansion;

a turbine rotating by contacting with the operating fluid flowing based on pressure difference between pressure of the evaporation chamber side and pressure of the heat-insulating expansion chamber side within a turbine room arranged on halfway of an operating fluid channel communicating the evaporation chamber and the heat-insulating expansion chamber;

an energy transmission mechanism having a rod extended from the turbine and outputting power;

a liquefied operating fluid reflux means for refluxing the operating fluid liquefied in the heat-insulating expansion chamber to the evaporation chamber; and an auxiliary heat exchanger assisting liquefaction of the operating fluid, the auxiliary heat exchanger being arranged at a position contactable with the operating fluid introduced from the turbine room;

wherein the operating fluid diverted from halfway of the operating fluid channel communicating the evaporation chamber and the turbine room is introduced in the auxiliary heat exchanger through a pressure reducing valve and the operating fluid introduced in the heat-insulating expansion chamber from the turbine room is cooled and liquefaction is assisted, and wherein the operating fluid discharged from the auxiliary heat exchanger is compressed and condensed by the compression liquefaction reflux means and the operating fluid is refluxed to the evaporation chamber. According to the above constitution, power can be more efficiently and continuously generated and power can be obtained as rotation power.

Hereafter, the power generation system according to the present embodiment and the electricity generation system according the present embodiment will be concretely described with reference to the drawings. Here, although it will be described a case that propane is adopted as the operating fluid, a kind of the operating fluid is not limited to this as previously mentioned in the above.

FIG. 1 concerns a whole constitution of an electricity generation system A according to the present embodiment and is a conceptual view in which each constitution and piping and the like are simply indicated while being omitted. As shown in FIG. 1, the electricity generation system A according to the present embodiment are constituted from a pressure-resistant closed circuit 1 converting foreign heat energy to kinetic energy while changing state of the operating fluid and circulating the operating fluid within the system, a heat exchange mechanism 2 giving and receiving the heat energy outside the system against the pressure-resistant closed circuit 1 and a control unit 3 controlling valves and pumps and the like provided in the pressure-resistant closed circuit 1. Here, the concept shown in FIG. 1 is adopted for an electricity generation systems B D mentioned later, in addition to the electricity generation system A.

Figure 2:
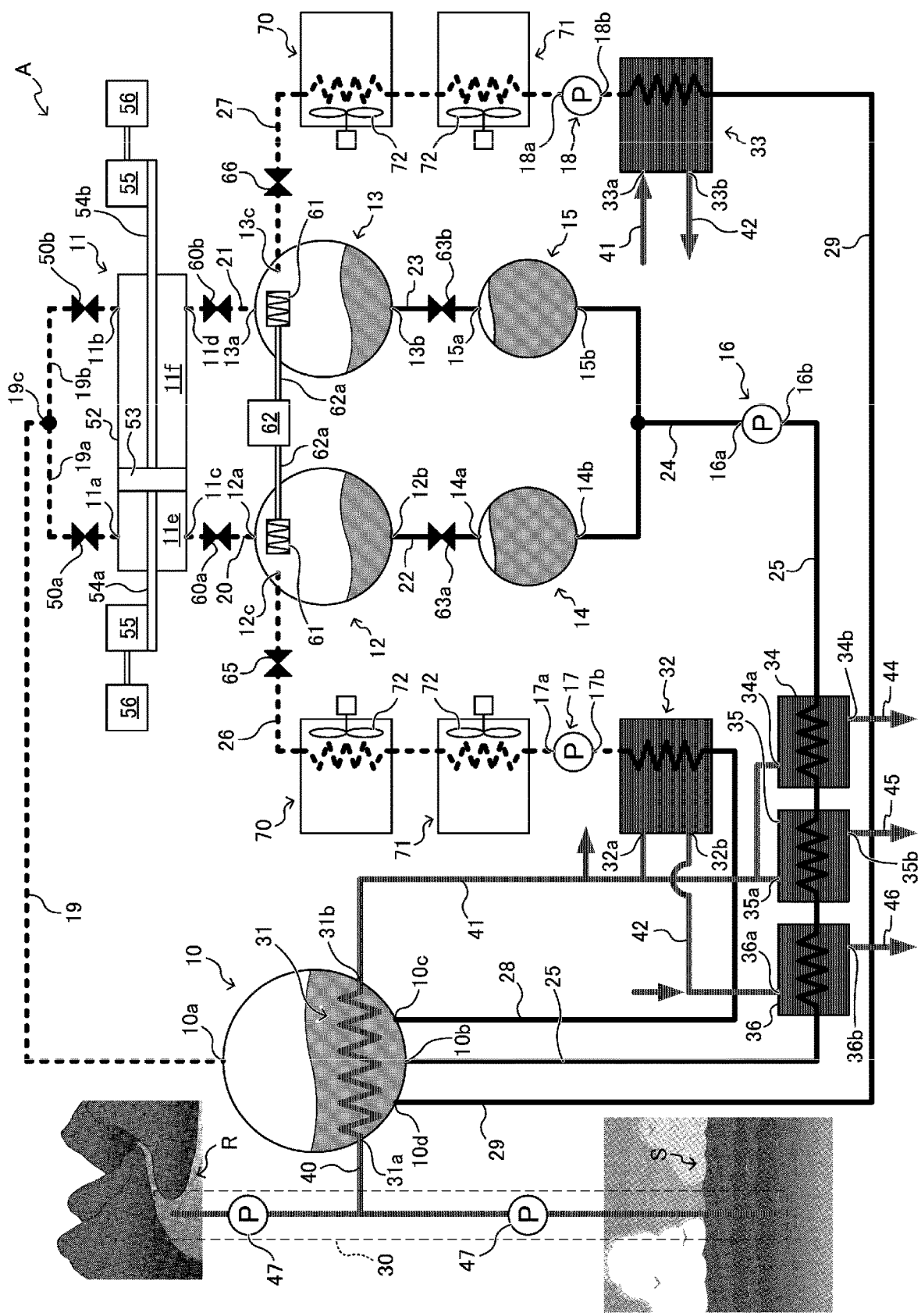
FIG. 2 is an explanatory view indicating a constitution of the electricity generation system according to the present embodiment.

FIG. 2 concerns the pressure-resistant closed circuit 1 and the heat exchange mechanism 2 of the electricity generation system A and is an explanatory view drawn while mixing more concrete constitution. As shown in FIG. 2, the pressure-resistant closed circuit 1 possesses an evaporation chamber 10, a reciprocal heat-insulating cylinder 11, a forward-side heat-insulating expansion chamber 12 and a backward-side heat-insulating expansion chamber 13, a forward-side buffer tank 14 and a backward-side buffer tank 15, a circulation pump 16, and a forward-side liquefaction pump 17 and a backward-side liquefaction pump 18. The heat exchange mechanism 2 is constituted by communicating and connecting these through operating fluid channels.

Further, the operating fluid channel possesses an operating fluid gas supply pipe 19 connecting a gas phase outlet 10a of the evaporation chamber 10 and both a forward channel supply port 11a and a backward channel supply port 11b of the reciprocal heat-insulating cylinder 11, a forward-side operating fluid gas discharge pipe 20 connecting a forward channel discharge port 11c of the reciprocal heat-insulating cylinder 11 and an expansion chamber inlet 12a of the forward-side heat-insulating expansion chamber 12, a backward-side operating fluid gas discharge pipe 21 connecting a backward channel discharge port 11d and an expansion chamber inlet 13a of the backward-side heat-insulating expansion chamber 13, an operating fluid flowing down pipe 22 connecting an operating fluid flowing down port 12b of the forward-side heat-insulating expansion chamber 12 and an operating fluid inlet 14a of the forward-side buffer tank 14, an operating fluid flowing down pipe 23 connecting an operating fluid flowing down port 13b of the backward-side heat-insulating expansion chamber 13 and an operating fluid inlet 15a of the backward-side buffer tank 15, a circulation pump supply pipe 24 connecting both an operating fluid outlet 14b of the forward-side buffer tank 14 and an operating fluid outlet 15b of the backward-side buffer tank 15 and an inlet 16a of the circulation pump 16, a circulation pump reflux pipe 25 connecting an outlet 16b of the circulation pump 16 and an inlet 10b of the evaporation chamber 10 to which the operating fluid is sent by the circulation pump 16, a forward-side gas phase sending pipe 26 connecting a gas phase discharge port 12c of the forward-side heat-insulating expansion chamber 12 and an inlet 17a of the forward-side liquefaction pump 17, a backward-side gas phase sending pipe 27 connecting a gas phase discharge port 13c of the backward-side heat-insulating expansion chamber 13 and an inlet 18a of the backward-side liquefaction pump 18, a forward-side compression/liquefaction liquid sending pipe 28 connecting an outlet 17b of the forward-side liquefaction pump 17 and a forward-side compression liquid inlet 10c of the evaporation chamber 10 and a backward-side compression liquid sending pipe 29 connecting an outlet 18b of the backward-side liquefaction pump 18 and a backward-side compression liquid inlet 10d of the evaporation chamber 10.

Further, the electricity generation system A possesses the heat exchange mechanism 2 to give and receive heat energy with fluid outside the system of the pressure-resistant closed circuit 1 against the operating fluid circulating in the pressure-resistant closed circuit 1.

The heat exchange mechanism 2 possesses a capture unit 30 to catch foreign heat energy supply medium, a foreign energy grant unit 31 constituted from a heat exchanger arranged so as to be soaked within liquid phase of the operating fluid at an inner bottom portion of the evaporation chamber 10, a forward-side condenser 32 arranged on halfway of the forward-side compression liquid sending pipe 28, a backward-side condenser 33 arranged on halfway of the backward-side compression/liquefaction liquid sending pipe 29 and the first~third warming heat exchangers 34, 35, 36 arranged in series in order from the upstream side on halfway of the circulation pump reflux pipe 25. The heat exchange mechanism 2 is constituted by communicating and connecting these devices through heat exchange medium channels.

The heat exchange medium channels are constituted from a supply medium sending pipe 40 connecting the capture unit 30 to catch foreign heat energy supply medium and an inlet 31a of the foreign energy grant unit 31, a supply medium discharge channel 41 connecting an outlet 31b of the foreign energy grant unit 31 and inlets 32a, 33a, 34a, 35a of each forward-side condenser 32, backward-side condenser 33, first warming heat exchanger 34, second warming heat exchanger 35, a cooling fluid discharge channel 42 connecting the outlets 32b, 33b of the forward-side condenser 32, the backward-side condenser 33 and an inlet 36a of the third warming heat exchanger 36 and first~third discharge channels 44, 45, 46 to discharge warming fluid from each of the outlets 34b, 35b, 36b of the first warming heat exchanger 34, the second warming heat exchanger 35, the third warming heat exchanger 36.

Next, each constitution of the pressure-resistant closed circuit 1 and the heat exchanger mechanism 2 will be described. The evaporation chamber 10 is formed by a closed pressure-resistant vessel that insulated gas phase capacity is about 100 capacity parts. Within the closes pressure-resistant vessel, liquid propane as the operating fluid (hereinafter, called as liquefied propane) and gaseous propane (hereinafter, called as propane gas) are stored. Further, capacity ratio of the liquefied propane and the propane gas stored in the vessel is generally made 10~1:5~1 and pressure of the propane gas is roughly made 7~9.5 atm.

Near the bottom of the evaporation chamber 10, that is, at a portion submerging in the liquefied propane stored therein, it is provided the foreign energy grant unit 31 for getting the temperature of the liquefied propane closer to the temperature of the heating fluid by heat exchange.

The heating fluid for heating flowing in the foreign energy grant unit 31 is seawater taken in through the capture unit 30 to catch foreign heat energy supply medium. In the present embodiment, it is used seawater of about 20~30° C.

The capture unit 30 to catch foreign heat energy supply medium is constituted, for example, so as to take seawater obtained from sea S in the capture unit 30 to catch foreign heat energy medium by an intake pump 47. Here, capture of foreign heat energy supply medium is not necessarily conducted by the intake pump 47 and the like, and for example, it may be possible that river water of river R running down by utilizing difference in height of mountains and the like is taken.

Seawater as the foreign heat energy supply medium taken in the capture unit 30 to catch foreign heat energy medium inflows from the inlet 31a in the foreign energy grant unit 31 through the sending pipe 40 to supply the medium as the heating fluid to heat so that the liquefied propane in the evaporation chamber 10 gets closer to the temperature of seawater and leaks from the outlet 31b.

Further, in the gas phase region in which propane gas is filled, the gas phase outlet 10a is formed by appearing a base end of the operating fluid gas supply pipe 19.

A top side of the operating fluid gas supply pipe 19 is diverged in bifurcated state by a branch portion 19c. Each of them is made as a forward-side branch pipe 19a connecting to the forward channel supply port 11a formed in a forward-side expansion room 11e of the reciprocal heat-insulating cylinder 11 and as a backward-side branch pipe 19b connecting to the backward channel supply port 11b formed in a backward-side expansion room 11f.

On halfway of the forward-side branch pipe 19a connecting between the branch portion 19c of the operating fluid gas supply pipe 19 and the forward channel supply port 11a, a forward-side supply valve 50a is provided and on halfway of the backward-side branch pipe 19b connecting between the branch portion 19c and the backward channel supply port 11b, a backward-side supply valve 50b is provided.

The forward-side supply valve 50a and the backward-side supply valve 50b are the valves to supply propane gas produced in the evaporation chamber 10 to the forward-side expansion room 11e or the backward-side expansion room 11f of the heat-insulating reciprocal cylinder 11 or to stop supply thereof. The forward-side supply valve 50a and the backward-side supply valve 50b are controllable by electrically connecting to the control unit 3 mentioned later.

The heat-insulating reciprocal cylinder 11 possesses a cylinder body 52 formed into a tube and a piston 53 reciprocally slidable within the cylinder body 52. Inner spaces of the cylinder body 52 partitioned by the piston 53 are respectively made as the forward-side expansion room 11e and the backward-side expansion room 11f. The maximum capacity of the forward-side expansion room 11e or the backward-side expansion room 11f is made about 1~2 capacity part (for example, 10 m$^3$) when the piston 53 reaches a dead point. At that time, the pressure of each expansion room substantially becomes a pressure as same as the pressure of the gas phase region in the evaporation chamber 10.

Further, to the piston 53, a forward-side rod 54a extending to a longitudinal direction of the cylinder body 52 and a backward-side rod 54b are provided. Each rod 54 is formed in a rack shape and a rack and pinion structure is formed by meshing the rod 54 with a pinion provided in a transmission 55.

The transmission 55 is a mechanism to increase (or decrease) rotation of the pinion and an output shaft of the transmission 55 is linked to a passive shaft of a generator 56, thereby power generation can be conducted.

In the forward-side expansion room 11e, it is formed the forward channel discharge port 11c to discharge propane gas therein and the forward channel discharge port 11c and the expansion chamber inlet 12a of the forward-side heat-insulating expansion chamber 12 are communicated and connected therebetween through the forward-side operating fluid gas discharge pipe 20.

Further, on halfway of the forward-side operating fluid gas discharge pipe 20, a forward-side discharge valve 60 is provided. Such forward-side discharge valve 60 is a valve to discharge/stop propane gas within the forward-side expansion room 11e to the forward-side heat-insulating expansion chamber 12. The forward-side discharge valve 60 is electrically connected to the control unit 3, thereby such valve 60 can be controlled.

The forward-side heat-insulating expansion chamber 12 is formed by an insulated closed pressure-resistant vessel with 4.5~18 capacity part and propane gas discharged from the forward-side expansion room 11e is adiabatically expanded and liquefied therein.

Propane gas introduced in the forward-side heat-insulating chamber 12 through the forward-side operation fluid gas discharge pipe 20 is decompressed to about 1.7~2.5 atm and the temperature thereof is decreased to −42~−10° C., thereby most of propane gas is liquefied. As a result, it concludes that liquid phase composed of liquefied propane produced by adiabatic expansion and gas phase thereof formed in the upper region exist in the forward-side heat-insulating chamber 12.

Further, in the forward-side heat-insulating chamber 12, a turbine 61 is provided in gas phase region portion contactable with propane flow inflowing from the expansion chamber inlet 12a.

This turbine 61 is linked to a generator 62 through a transmission shaft 62a for transmitting rotation power, thereby further electricity generation can be done by utilizing kinetic energy of propane inflowing in the forward-side heat-insulating expansion chamber 12 based on pressure difference.

At the bottom portion of the forward-side heat-insulating expansion chamber 12, the operating fluid flowing down port 12b is formed and the operating fluid flowing down pipe 22 communicating with the operating fluid inlet 14a of the forward-side buffer tank 14 is provided from the operating fluid flowing down port 12b.

The forward-side buffer tank 14 is a tank to recover liquefied propane produced in the forward-side heat insulating expansion chamber 12 and temporarily stock therein and the forward-side buffer tank 14 is arranged at a position lower than the forward-side heat-insulating expansion chamber 12 so that the operating fluid inlet 14a positions at a lower position than the operating fluid flowing down port 12b.

On halfway of the operating fluid flowing down pipe 22, it is provided a forward-side flowing down valve 63a to open or close the channel of the operating fluid flowing down pipe 22. This forward-side flowing down valve 63a is made controllable by electrically connecting to the control unit 3 mentioned later. When the forward-side flowing down valve 63a is controlled in an opening state by the control unit 3, liquefied propane remaining on the bottom portion in the forward-side heat-insulating expansion chamber 12 flows down by its own weight in the forward-side buffer tank 14 and such liquefied propane is stored.

Here, as one characteristic point in the pressure-resistant closed circuit 1 of the power generation system A according to the present embodiment, it can be raised a point that constitution as same as the constitution from the above forward channel discharge port 11c to the forward-side operating fluid gas discharge pipe 20 in which the forward-side discharge valve 60a is provided, the forward-side heat-insulating expansion chamber 12 is provided at the backward channel discharge port 11d side as shown in FIG. 2.

Since each characteristic is as same as the forward side, concrete explanation will be omitted. Based on that such constitution is provided, according to an operation (hereinafter, called as forward channel operation) in which the propane gas is introduced in the forward-side expansion room 11e in the heat-insulating reciprocal cylinder 11 and the piston 53 is moved, propane gas discharged from the backward-side expansion room 11f is liquefied in the backward-side heat-insulating expansion chamber 13. According to an operation (hereinafter called as backward channel operation) in which propane gas is introduced in the backward-side expansion room 11f and the piston 53 is moved, propane gas discharged from the forward-side expansion room 11e can be liquefied in the forward-side heat-insulating expansion chamber 12.

Provisionally, in a case that only one heat-insulating expansion room used in both the forward and backward operations is provided, for example, liquefication efficiency goes down unless acceptance of propane gas from the forward-side expansion room 11e according to the backward operation is done after waiting till pressure of propane gas discharged from the backward-side expansion room 11f by the forward operation goes down enough and it becomes difficult to rapidly shift to the backward operation, thereby power production efficiency or power generation efficiency goes down. However, in the power generation system A according to the present embodiment, since the forward-side heat-insulating expansion chamber 12 and the backward-side heat-insulating chamber 13 are independently provided at both downstream sides of the forward-side operating fluid gas discharge pipe 20 of the forward-side expansion room 11e and the backward-side operating fluid gas discharge pipe 21 of the backward-side expansion room 11f, efficient liquefaction of propane gas can be realized and rapid backward operation is realized, thereby efficient power production and electricity power generation can be conducted.

Further, in the electricity power generation system A according to the present embodiment, also as for the constitution of the operating fluid flowing down pipe 22 in which the forward-side flowing down valve 63a and the forward-side buffer tank 14, since the operating fluid flowing down pipe 23 in which the backward-side flowing down valve 63b and the backward-side buffer tank 15 are similarly provided, pressure in the forward-side heat-insulating expansion chamber 12 and the backward-side heat-insulating expansion chamber 13 can be rapidly reset in a state that propane gas discharged from each expansion room of the insulating reciprocal cylinder 11 can be accepted.

Explanation will return to the pressure-resistant circuit 1. At bottoms of the forward-side buffer tank 14 and the backward-side buffer tank 15, the operating fluid outlets 14b, 15b are respectively formed and branch pipe portions of the circulation pump supply pipe 24 formed in a bifurcated shape as base ends are respectively connected to the operating fluid outlets 14b, 15b. Top portion to which the branch pipe portions are joined is connected to the inlet 16a of the circulation pump 16.

Further, the outlet 16b of the circulation pump 16 is communicated with and connected to the inlet 10b of the evaporation chamber 10 to which the operating fluid is sent through the circulation pump reflux pipe 25. Based on that the circulation pump 16 is operated, it is constituted so that liquefied propane stored in the forward-side buffer tank 14 and the backward-side buffer tank 15 is refluxed to the evaporation chamber 10.

Further, on halfway of the circulation pump reflux pipe 25, the first warming heat exchanger 34, the second warming heat exchanger 35 and the third warming heat exchanger 36 are provided and heat exchange is conducted with warming fluid. Temperature (about −42° C.~−10° C.) of liquefied propane sent by the circulation pump 16 is gradually warmed and is got closer to the temperature of seawater as the heating fluid previously mentioned, thereafter is refluxed in the evaporation chamber 10.

The first and the second warming heat exchangers 34, 35 receive the heating fluid the temperature of which is decreased by heat exchange in the foreign energy grant unit 31 of the evaporation chamber 10 as the warming fluid for warming liquefied propane flowing in the circulation pump reflux pipe 25 through the supply medium discharge channel 41, thereby conducts heat exchange.

Thereby, the temperature of liquefied propane flowing in the circulation pump reflux pipe 25 is warmed from −42~ −10° C. to 2~5° C. by the first warming heat exchanger 34 and is further warmed from 2~5° C. to 10~15° C. by the second warming heat exchanger 35.

On the other hand, seawater of 2~5° C. is discharged from the first warming fluid discharge channel 44 of the first warming heat exchanger 34 and seawater of 10~15° C. is discharged from the second warming fluid discharge channel 45 of the second warming heat exchanger 35.

Such cold water can be utilized as a cold heat source. That is, the electricity generation system A according to the present embodiment has another aspect as a system for supplying cold water.

The third warming heat exchanger 36 receives cooling fluid to which heat exchange is performed in the forward-side condenser 32 and the backward-side condenser 33 (mentioned later) as warming fluid which is provided for warming liquefied propane passing through the first warming heat exchanger 34 and the second warming heat exchanger 35. Thereafter, heat exchange is done.

Thereby, the temperature of liquefied propane flowing in the circulation pump reflux pipe 25 is heated from 10~15° C. warmed in the second warming heat exchanger 35 to 20~30° C. closer to the temperature of warming fluid and liquefied propane is refluxed to the evaporation chamber 10.

In this third heat exchanger for heating 36, seawater of 20~30° C. is discharged from the third warming discharge channel 46 and this seawater can be also utilized for appropriate as heat source.

Here again, explanation will shift to the constitution near the forward-side heat-resistant expansion chamber 12 and the backward-side heat-resistant expansion chamber 13. In the gas phase regions within the forward-side heat-resistant expansion chamber 12 and the backward-side heat-resistant expansion chamber 13, each of base ends of the forward-side gas phase sending pipe 26 and the backward-side gas phase sending pipe 27 appears, thereby the gas phase discharge ports 12c, 13c are formed.

Top portions of the forward-side gas phase sending pipe 26 and the backward-side gas phase sending pipe 27 are respectively connected to the inlets 17a, 18a of the forward-side liquefaction pump 17 and the backward-side liquefaction pump 18, thereby propane gas constituting gas phase within the forward-side heat-resistant expansion chamber 12 and the backward-side heat-resistant expansion chamber 13 can be sent to the forward-side liquefaction pump 17 and the backward-side liquefaction pump 18.

Further, on halfway of the forward-side gas phase sending pipe 26 and the backward-side gas phase sending pipe 27, forward-side gas phase supply valve 65 and backward-side gas phase supply valve 66 are respectively provided.

These gas phase supply valves 65, 66 are electrically connected to the control unit 3. Based on that the gas phase supply valves 65, 66 are operated so as to open at predetermined timings, propane gas within the forward-side heat-resistant expansion chamber 12 and the backward-side heat-resistant expansion chamber 13 is introduced to the forward-side liquefaction pump 17 and the backward-side liquefaction pump 18 while further being decompressed and dropped in temperature.

The forward-side liquefaction pump 17 and the backward-side liquefaction pump 18 are pumps to compress propane gas, thereby to liquefy propane gas and thereafter to send.

As one characteristic constitution in the electricity generation system A according to the present embodiment, freezer compartments 70 and cold rooms 71 are respectively provided between the forward-side gas phase supply valve 65 and the forward-side liquefaction pump 17 and between backward-side gas phase valve 66 and the backward-side liquefaction pump 18.

Within the freezer compartments 70 and the cold rooms 71, the forward-side gas phase sending pipe 26 and the backward-side gas phase sending pipe 27 formed in a shape of high heat exchange efficiency are exposed. Based on that funs 72 respectively provided in the freezer compartment 70 and the cold room 71 are driven, insides of the freezer compartment 70 and the cold room 71 can be cooled by propane gas cooled through adiabatic expansion in the forward-side heat-resistant expansion chamber 12 and the backward-side heat-resistant expansion chamber 13.

Liquefied propane sent from the outlets 17b, 18b of the forward-side liquefaction pump 17 and the backward-side liquefaction pump 18 is supplied in the evaporation chamber 10 from the forward-side compression liquid inlet 10c and the back-ward side compression liquid inlet 10d through the forward-side compression liquid sending pipe 28 and the backward-side compression liquid sending pipe 29.

Further, on halfway of the forward-side compression liquid sending pipe 28 and the backward-side compression liquid sending pipe 29, the forward-side condenser 32 and the backward-side condenser 33 are arranged. The forward-side condenser 32 and the backward-side condenser 33 conduct heat exchange with cooling fluid, recover liquefaction latent heat of propane gas sent by the forward-side liquefaction pump 17 and the backward-side liquefaction pump 18, get temperature of liquefied propane closer to temperature of seawater as heating fluid previously mentioned and refluxes liquefied propane in the evaporation chamber 10.

As cooling fluid used for heat exchange in the forward-side condenser 32 and the backward-side con denser 33, it is utilized heating fluid the temperature of which is dropped by heat exchange in the foreign energy grant unit 31 of the evaporation chamber 10.

Therefore, in comparison with a case that seawater is supplied as it is to the forward-side condenser 32 and the backward-side condenser 33 as cooling fluid for cooling, liquefaction efficiency can be made better.

Further, as previously mentioned, cooling fluid used for heat exchange in the forward-side condenser 32 and the backward-side condenser 33 is utilized as warming fluid in the third warming heat exchanger 36.

Therefore, the temperature of liquefied propane flowing in the circulation pump reflux pipe 25 can more efficiently be raised, thereby evaporation efficiency in the evaporation chamber 10 can be maintained.

Figure 3:
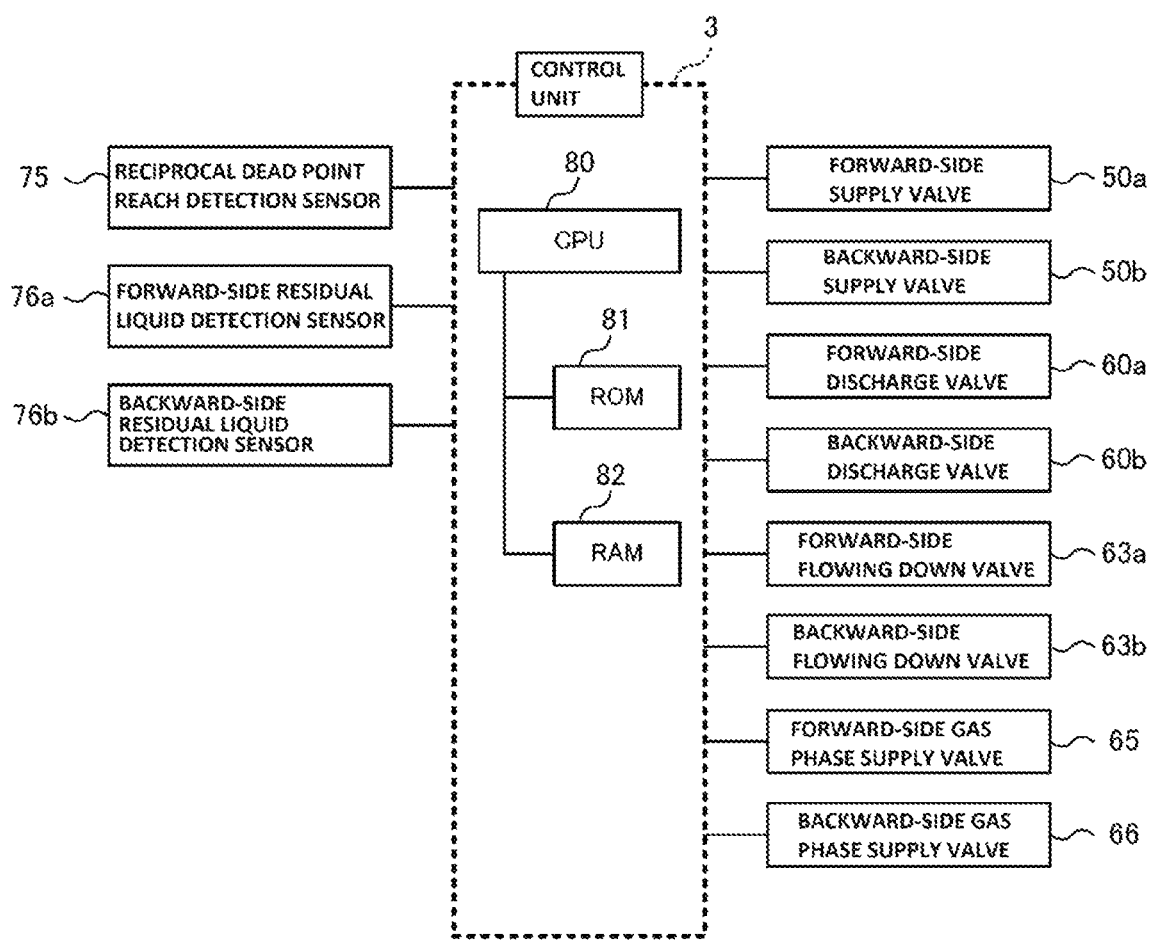
FIG. 3 is a block diagram indicating an electric constitution of the electricity generation system.

Next, an electrical constitution of the electricity generation system A will be described with reference to FIG. 3. FIG. 3 is an explanatory view indicating an electrical constitution of the electricity generation system A according to the present embodiment.

The control unit 3 possesses a CPU 80, a ROM 81 and a RAM 82 therein, thereby programs necessary for the electricity generation system A can be executed. Further, the RAM 82 in the control unit 3 functions as a temporary memory area to store necessary variables and the like when programs are executed by the CPU 80. In the ROM 81, programs and the like necessary for operating the electricity generation system A are stored.

Further, to the control unit 3, as shown in FIG. 3, a reciprocal dead point reach sensor 75, the forward-side supply valve 50a, the backward-side supply valve 50b, the forward-side discharge valve 60a, the backward-side discharge valve 60b, the forward-side flowing down valve 63a, the backward-side flowing down valve 63b, the forward-side gas phase supply valve 65 and the backward-side gas phase supply valve 66 are electrically connected. Thereby, it is constituted so that such components are referred according to execution state of programs in the control unit 3 and are controlled/driven.

The reciprocal dead point reach sensor 75 is a sensor for detecting whether the piston 53 of the heat-resistant reciprocal cylinder 11 reaches the dead point (forward dead point) by forward operation or reaches the dead point (backward dead point) by backward operation. The detection data output from the reciprocal dead point reach sensor 75 is stored in the predetermined address in the RAM 81 at any times as dead point reach flag. The dead point reach flag indicates whether the piston 53 reaches the forward dead point or the piston 53 reaches the backward dead point and takes a value of [0]~[2]. Here, [0] means [not reach dead point], [1] means [reach the forward dead point], and [2] means [reach the backward dead point].

A forward-side residual liquid detection sensor 76a is a sensor to detect whether or not liquid phase of operating fluid exists in the forward-side heat-insulating expansion chamber 12. As mentioned above, although gas phase in the forward-side heat-insulating expansion chamber 12 is supplied to the freezer compartment 70 and the cold room 71 through the forward-side gas phase supply valve 65, when liquid phase in the forward-side heat-insulating expansion chamber 12 exists, liquid phase evaporates so as to compensate gas phase decompressed according to opening of the forward-side gas phase supply valve 65, thereby smooth gas phase decompression is hindered. Thus, when liquid phase is flown down by opening the forward-side flowing down valve 63a, thereby liquid phase is discharged to the forward-side buffer tank 14 from the forward-side heat-insulating expansion chamber 12, the forward-side residual liquid detection sensor 76a outputs a signal corresponding to a state that liquid phase within the forward-side heat-insulting chamber 20 is discharged to a liquid volume with an extent that smooth gas phase decompression is not hindered and liquid phase is reduced, that is, liquid phase does not substantially exist (hereafter, called as state with no residual liquid) or a state that liquid phase still exists in the forward-side heat-insulating chamber 12 (hereinafter, called as state with residual liquid).

The signal output from the forward-side residual liquid detection sensor 76a is stored at any times in predetermined address of the RAM 82 as a forward-side residual liquid flag. The forward-side residual liquid flag is a flag taking value of [0] or [1]. Here, [0] means a state with no residual liquid and [1] means a state with residual liquid.

Further, similarly to the backward-side heat-insulating expansion chamber 13, a backward-side residual liquid detection sensor 76b is arranged at a position to be able to detect a state with no residual liquid and a state with residual liquid. It is constituted that a signal output from the backward-side residual liquid detection sensor 76b is stored at any times in predetermined address of the RAM 82 as a backward-side residual liquid flag.

Next, with reference to FIG. 4, it will be described opening/closing control process (hereinafter, called as valve control process) of each of the supply valves 50a, 50b, the discharge valves 60a, 60b, the flowing down valves 63a, 63b, the gas phase supply valves 65, 66, thee control process being executed in the control unit 3. The valve control process executed in the control unit 3 is executed a part of overall process (hereinafter, called as main routine) to supervise whole apparatus such as control of each pump in the electricity generation system A, control of electricity generation quantity and operation response of a user. Here, the valve control process will be concretely described and explanation of each of the other processes in the main routine will be omitted.

Figure 4:
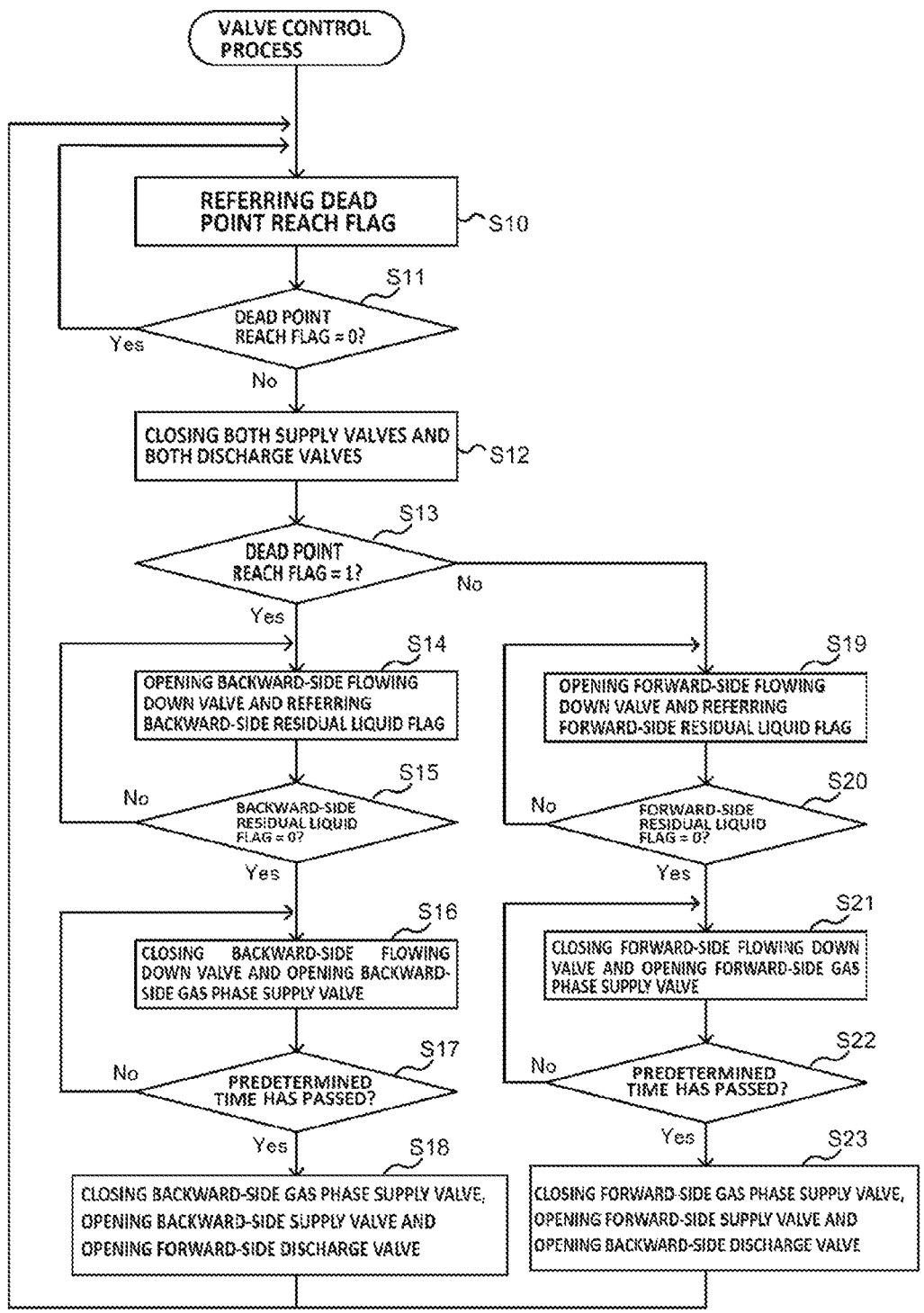
FIG. 4 is a flowchart indicating processes executed in the control unit.

As shown in FIG. 4, in the valve control process, the CPU 80 first refers the value of the dead point reach flag stored in the predetermined address of the RAM 82 (step S1).

Next, the CPU 80 judges whether or not the value of the dead point reach flag referred is [0], that is, it is a state that the piston 53 of the heat insulating cylinder 11 does not reach the dead point (step S11). Here, if the CPU 80 judges that the dead point flag is [0] (step 11:Yes), the CPU 80 again returns procedure to step S10. On the other hand, if the CPU 80 judges that the dead point flag is not [0] (step S11: No), the CPU 80 shifts procedure to step S12.

In step S12, the CPU 80 closes both the forward-side supply valve 50a and the backward-side supply valve 50b and both the forward-side discharge valve 60a and the backward-side discharge valve 60b.

Next, the CPU 80 judges whether or not the dead point flag is [1], that is, it is a state that the piston 53 reaches the forward-side dead point (step S13). Here, if the CPU 80 judges that the dead point reach flag is [1] (step S13: Yes), the CPU 80 shifts procedure to step S14.

In step S14, the CPU 80 closes the backward-side flowing down valve 63b and refers the value of the backward-side residual liquid flag stored in the predetermined address of the RAM 82.

Next, the CPU 80 judges whether or not the value of the backward-side residual liquid flag referred is [0] (step S15). Here, if the CPU 80 judges that the backward-side residual flag is not [0] (step S15: No), the CPU 80 returns procedure to Step S14. On the other hand, if the CPU 80 judges that the backward-side residual liquid flag is [0] (step 15:Yes), the CPU 80 shifts procedure to Step S16.

In step S16, the CPU 80 close the backward-side flowing down valve 63b and additionally opens the backward-side gas phase supply valve 66. Further, the PCU 80 judges whether or not it has passed a predetermined time enough for propane gas constituting gas phase within the backward-side heat-insulating expansion chamber 13 to be supplied through the backward-side gas phase sending pipe 27 (step S17).

Here, if the CPU 80 judges that the predetermined time has not passed (step 17: No), the CPU 80 executes step S16 till the predetermined time has passed and maintains the open state of the backward-side gas phase supply valve 66. On the other hand, the CPU 80 judges that the predetermined time has passed (step S17: Yes), the CPU 80 closes the backward-side gas phase supply valve 66 and opens the backward-side supply valve 50b and opens the forward-side discharge valve 60a (step S18). Thereby, propane gas inflows to the backward-side expansion room 11f and the reciprocal heat-insulating cylinder 11 conducts backward operation. After step S18 is finished, the CPU 80 again returns procedure to step S10.

On the other hand, in step S13, if the CPU 80 judges that the dead point reach flag is not [1] (step S13: No), the CPU 80 shifts procedure to step S19.

In step S19, the CPU 80 opens the forward-side flowing down valve 63a and refers the value of the forward-side residual liquid flag stored in the predetermined address of the RAM 82.

Next, the CPU 80 judges whether or not the value of the forward-side residual liquid flag is [0] (step S20). Here, if the CPU 80 judges that the forward-side residual liquid flag is not [0] (step S20: No), the PCU 80 shifts procedure to step S19. On the other hand, if the CPU 80 judges that the forward-side residual liquid flag is [0] (step S20: Yes), the CPU 80 shifts procedure to step S21.

In step S21, the CPU 80 closes the forward-side flowing down valve 63a and additionally opens the forward-side gas phase supply valve 65, thereafter judges whether or not it has passed a predetermined time enough for propane gas constituting gas phase within the forward-side heat-insulating expansion chamber 12 to be supplied through the forward-side gas phase sending pipe 26 (step S22).

Here, if the CPU 80 judges that the predetermined time has not passed (step S22: No), the CPU 80 executes step S21 till the predetermined time has passed and maintains open state of the forward-side gas phase supply valve 65. On the other hand, if the CPU 80 judges that the predetermined time has passed (step S22: Yes), the CPU 80 closes the forward-side gas phase supply vale 65, opens the forward-side supply valve 50a and opens the backward-side discharge valve 60b (step S23). Thereby, propane gas is flown in the forward-side expansion room 11e and the heat-insulating reciprocal cylinder 11 conducts reciprocal operation. After the present step S23 is finished, the CPU 80 again returns procedure to step S10.

As mentioned, in the electricity generation system A according to the present embodiment, corresponding to that the above processes are done, efficient operation of the heat insulating reciprocal cylinder 11 is continuously conducted.

In particular, the CPU 80 executes step S18 and step S23, thereby the supply channel forming operation and the discharge channel forming operation are conducted. Further, while judging in step S13, the CPU alternately conducts channel forming operation for the forward-side and the backward-side, thereby operating fluid supply discharge means is realized. Thus, in the electricity generation system A having two heat-insulating expansion chambers of the forward-side heat-insulating expansion chamber 12 and the backward-side heat-insulating expansion chamber 13, efficient power generation and electricity generation can be conducted.

Further, if the CPU 80 judges No in step S11, that is, in a case that the piston reaches any of forward-side dead point and backward-side dead point and it is a switching timing of reciprocal operation of the rod, the CPU 80 executes step S12 and temporarily closes supply and discharge channels of the operating fluid to the expansion chamber. Next, by executing step S16 and step S21, the CPU 80 opens the gas phase supply valves 65, 66 as the on-off valve and conducts decompression feeding operation to introduce propane gas to the forward-side liquefaction pump 17 as the compression circulation means while doing adiabatic expansion of gas phase in the heat-insulating expansion rooms and decreasing the temperature. Thereby, pressure control of the heat-insulating rooms can be firmly conducted and liquefaction of operating fluid can be efficiently realized, thus extremely efficient power generation and electricity generation can be done.

Figure 5:
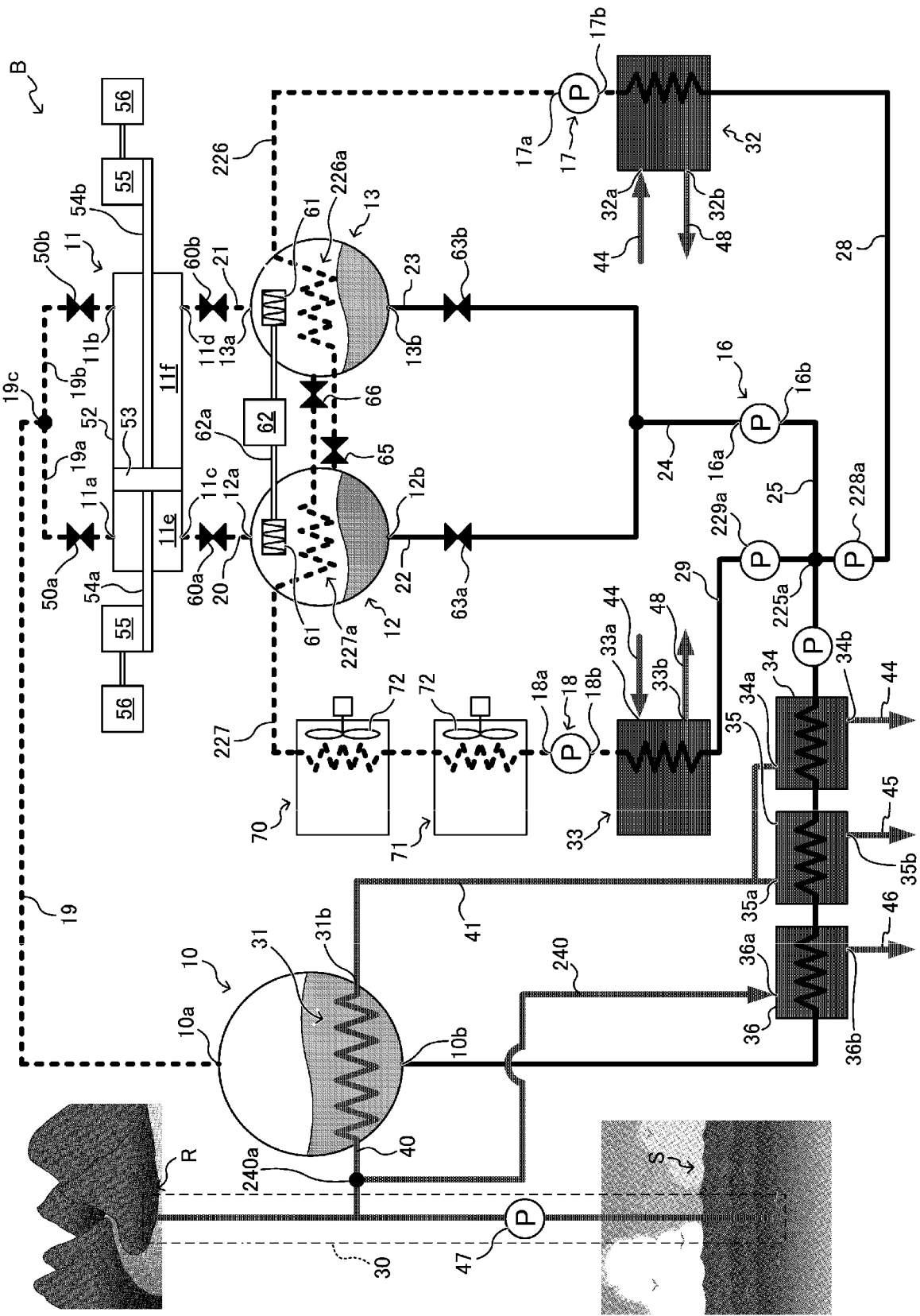
FIG. 5 is an explanatory view indicating a constitution of the electricity generation system according to the second embodiment.

Next, an electricity generation system B according to the second embodiment will be described with reference to FIG. 5. Here, in the following description, as for the constitution already mentioned, there will be a case that the same signs are added and explanation thereof is omitted. Further, it will be possible that temperatures and pressures and the like of the operating fluid and each heating medium, warming medium, cooling medium generally accords the example of the electricity generation system A, however, are changed if necessary.

The electricity generation system B has the constitution substantially similar to the electricity generation system A previously mentioned. However, the electricity generation system B is different from the electricity generation system A at the following points.

buffer tanks are not provided in the downstream of the forward-side heat-insulating expansion chamber 12 and the backward-side heat-insulating expansion chamber 13, a forward-side gas phase sending pipe 226 extended from the gas phase portion of the forward-side heat-insulating expansion chamber 12 penetrates in the backward-side heat-insulating expansion chamber 13 and a backward-side gas phase sending pipe 227 extended from the gas phase portion in the backward-side heat-insulating expansion chamber 13 penetrates in the forward-side heat-insulating expansion chamber 12, further in the operating fluid channel portion penetrated in each heat-insulating expansion chambers 12, 13, heat exchange units 226a, 227a are provided, the operating fluid liquefied in the forward-side condenser 32 and the backward-side condenser 33 is joined with the operating fluid flowing in the circulation pump reflux pipe 25 circulating to the evaporation chamber 10 through the circulation pump 16 at the point which is upstream side than the first warming heat exchanger 34 and is downstream side than the circulation pump 16, the first warming fluid discharge channel 44 of the first warming heat exchanger for heating 34 is connected to the inlet 32a of the forward-side condenser 32 and the inlet 33a of the backward-side condenser 33, the freezer compartment 70 and the cold room 71 are provided to only one of the forward-side gas phase sending pipe 226 and the backward-side gas phase sending pipe 227, and a warming heat medium sending pipe 240 branched from halfway of the supply medium sending pipe 40 upstream than the foreign energy grant unit 31 is connected to the inlet 36a, thereby heat medium for warming of the third warming heat exchanger 36 is obtained.

Each constitution will be concretely described. First, in the electricity generation system B, the buffer tank is not provided at the downstream of the forward-side heat-insulating expansion chamber 12 and the backward-side heat-insulating expansion chamber 13. This does not hinder provision of the buffer tank as the electricity generation system A. However, since as mentioned later, the heat exchange units 226a, 227a are provided and it is hindered re-evaporation of liquefied operating fluid remaining in the heat-insulating expansion chambers 12, 13 even if the forward-side gas phase sending pipe 65 and the backward-side gas phase sending pipe 66 are opened, it is not necessary to empty within the heat-insulating chambers 12, 13 as much as possible when the forward-side gas phase supply valve 65 and the backward-side gas phase supply valve 66 are opened. Therefore, whole constitution of the electricity generation system B can be simplified.

Further, in the electricity generation system B, the forward-side gas phase sending pipe 226 extended from gas phase portion of the forward-side heat-insulating expansion chamber 12 penetrates in the backward-side heat-insulating expansion chamber 13 and is connected to the inlet 17a of the forward-side liquefaction pump 17, on the other hand, the backward-side gas phase sending pipe 227 extended from gas phase portion of the backward-side heat-insulating expansion chamber 13 penetrates in the forward-side heat-insulating expansion chamber 12 and is connected to the inlet 18a of the backward-side liquefaction pump 18.

Further, at positions existing on half of the forward-side gas phase sending pipe 226 and the backward-side gas phase sending pipe 227 respectively penetrating each heat-insulating expansion chamber 12, 13 and being able to contact with the operating fluid inflowing from the expansion chamber inlet 13a and the expansion chamber inlet 12a, the heat exchange units 226a, 227a are formed.

Therefore, for example, when the forward-side gas phase valve 65 is opened and gas phase in the forward-side heat-insulating expansion chamber 12 inflows in the forward-side gas phase sending pipe 226 while being decompressed, the heat exchange unit 226a is cooled.

Next, when the operating fluid inflows in the backward-side heat-insulating expansion chamber 13, from the expansion chamber inlet 13a according to forward operation, most of the operating fluid is liquefied by adiabatic expansion and the operating fluid not liquefied also contacts with the cooled heat exchange unit 226a, thereby is liquefied. Thus, firm liquefaction within the backward-side heat-insulating expansion chamber 13 can be realized. Similarly, when the backward-side gas phase sending valve 66 is opened and the heat exchange unit 227a is cooled, thereby the operating fluid inflows in the backward-side heat-insulating expansion chamber 12 form the expansion chamber inlet 12a according to backward operation, firm liquefaction can be realized.

Further, in the electricity generation system B, based on that the operating fluid liquefied in the forward-side condenser 32 is compressed and sent by a joining pump 228a, at a joining portion 225a arranged at a position existing upstream side than the first heat exchanger 34 and downstream side than the circulation pump 16, the operating fluid is joined with the liquefaction operating fluid flowing in the circulation pump reflux pipe 25 circulating the operating fluid to the evaporation chamber 10. Similarly, at the backward-side, based on that operating fluid liquefied in the backward-side condenser 33 is compressed and sent by a joining pump 229a, the operating fluid is joined at the joining portion 225a with the liquefaction operating fluid flowing in the circulation pump reflux pipe 25 circulating the operating fluid to the evaporation chamber 10. Therefore, when liquefied operating fluid is circulated to the evaporation chamber 10, piping system can be further simplified.

Further, in the electricity generation system B, the first heating fluid discharge channel 44 is connected to the inlet 32a of the forward-side condenser 32 and the inlet 33a of the backward-side condenser 33.

Therefore, as the electricity generation system A, in comparison with a case that heating fluid after heat exchange is done in the foreign energy grant unit 31 is utilized as cooling fluid of the forward-side condenser 32 and the backward-side condenser 33, aggregation can be conducted more efficiently. Here, the cooling fluid after heat exchange is done in the forward-side condenser 32 and the backward-side condenser 33 is discharged from a drainage pipe 48 through the outlet 32b and the outlet 33b.

Further, in the electricity generation system B, the freezer compartment 70 and the cold room 71 are provided on halfway of the backward-side gas phase sending pipe 227, on the other hand, the freezer compartment 70 and the cold room 71 are not provided on halfway of the forward-side gas phase sending pipe 226. This does not hinder that the freezer compartment 70 and the cold room 71 are provided in both the forward-side gas phase sending pipe 226 and the backward-side gas phase sending pipe 227 and exemplifies that it is not necessary to provide the freezer compartment 70 and the cold room 71 in both the forward-side gas phase sending pipe 226 and the backward-side gas phase sending pipe 227.

Further, in the electricity generation system B, the warming heat medium sending pipe 240 branched from a branch portion 240a positioning on halfway of the sending pipe 40 of upstream side than the foreign energy grant unit 31 is connected to the inlet 36a and a part of warming fluid flowing the sending pipe 40 is obtained as the warming heat medium.

Based on that the system B is constituted according to the above, firm temperature rising of the operating fluid refluxed to the evaporation chamber 10 can be conducted while piping system of the heat exchange mechanism 2 can be simply constituted.

According to the electricity generation system B constituted in the above, it can be constructed the power generation system and the electricity generation system using the power generation system through which efficient electricity generation can be conducted.

Figure 6:
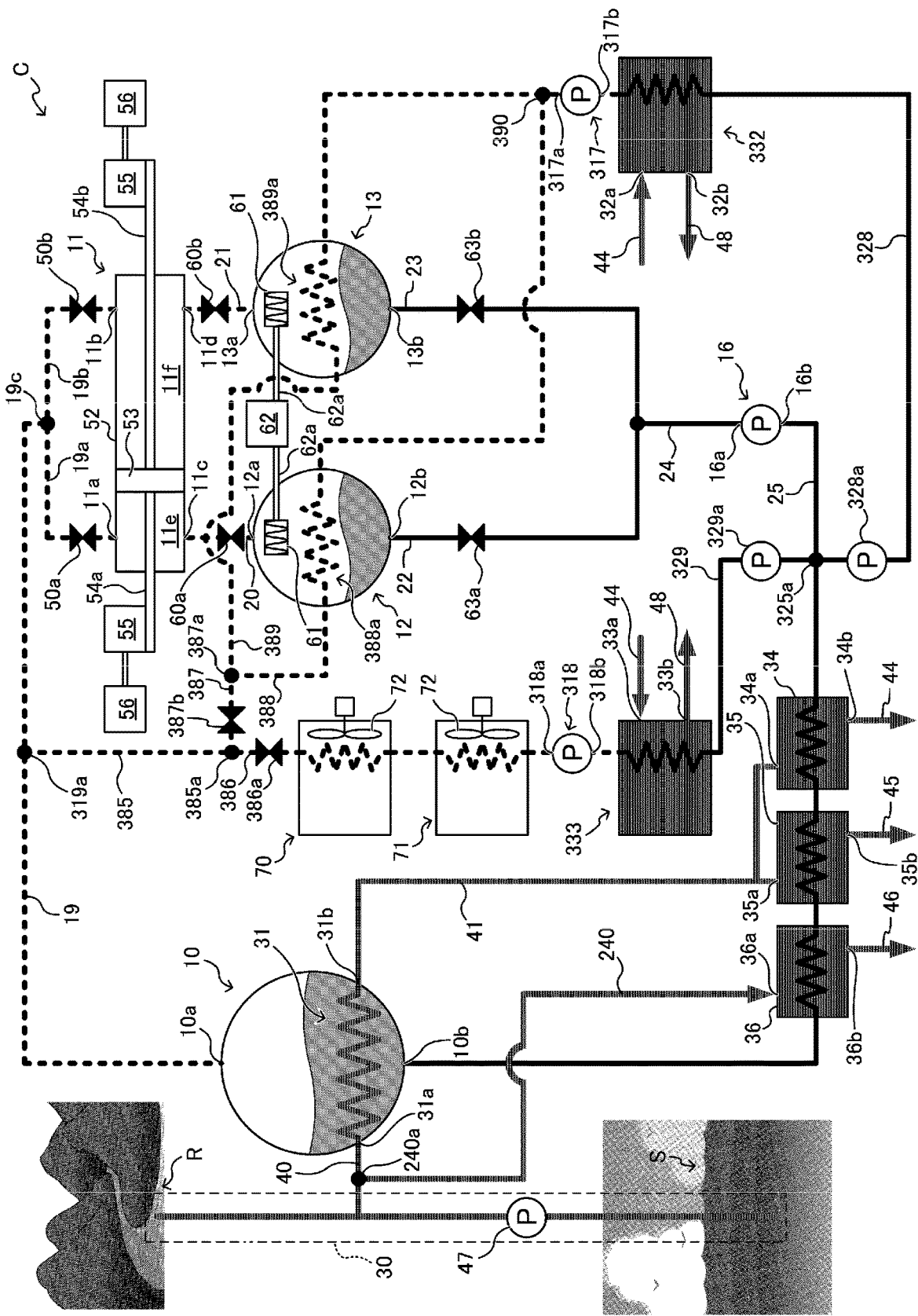
FIG. 6 is an explanatory view indicating a constitution of the electricity generation system according to the third embodiment.

Next, an electricity generation system C according to the third embodiment will be described with reference to FIG. 6. Although the electricity generation system C has a constitution substantially as same as the electricity generation system A and the electricity generation system B mentioned in the above, the constitution of the electricity generation system C is mainly different from the electricity generation system A and the electricity generation system B at the following points.

it is not provided piping system sending gas phase of operating fluid from the heat-insulating expansion chamber 12, 13, a second branch portion 319a is provided at downstream side than the branch portion 19c on the operating fluid gas supply pipe 19 and a cooling pipe 385 is branched from the operating fluid gas supply pipe 19 and is utilized for cooling both a heat exchange unit 388a, 389a arranged in each of the heat-insulating expansion chamber 12, 13 and the freezer compartment 70 and the cold room 71.

Each constitution will be concretely described. First, in the electricity generation system C, it is not provided a piping system for introducing gas phase of the heat-insulating expansion chamber 12, 13 to the compression and liquefaction means, corresponding the forward-side gas phase sending pipe 26 and the forward-side gas phase sending pipe 226, the backward-side gas phase sending pipe 27 and backward-side gas phase sending pipe 227 in the electricity generation system A and the electricity generation system B. This is because liquefaction of operating fluid in the heat-insulating expansion chamber 12, 13 can be more solidly conducted through the cooling pipe 385 branched at the second branch portion 319a mentioned later.

In the electricity generation system C, it is provided the second branch portion 319a at the downstream side than the branch portion 19c on the operating fluid gas supply pipe 19 and the cooling pipe 385 is branched from the operating fluid gas supply pipe 19.

The cooling pipe 385 is branched into a cooling system pipe 386 for cooling equipment and a liquefaction auxiliary system pipe 387 at a third branch portion 385a.

The cooling system pipe 386 is connected to an inlet 318a of the cooling system liquefaction pump 318 and on halfway thereof the freezer compartment 70 and the cold room 71 are provided. Operating fluid compressed and liquefied by the cooling system liquefaction pump 318 is ejected from an outlet 318b and condensed and liquefied in a cooling system condenser 333, thereafter the operating fluid is joined with operating fluid flowing in the circulation pump reflux pipe 25 by joining pump 329a at a joining portion 325a through a cooling system compression liquefaction sending pipe 329.

Further, a flow control valve 386a provided on halfway of the cooling system pipe 386 for cooling cold facility is a valve to decompress and decrease the temperature of the operating fluid and is electrically connected to the control unit 3. Degree of opening and closing of the flow control valve 386a is adjusted by feed-back control based on temperature sensor and the like (not shown) provided in the freezer compartment 70 and the cold room 71, thereby internal temperature is adjusted.

On the other hand, the liquefaction auxiliary system pipe 387 branched at the third branch portion 385a is branched into a forward-side liquefaction auxiliary pipe 388 and a backward-side liquefaction auxiliary pipe 389 at a fourth branch portion 387a. Here, a decompression valve 387b provided in the liquefaction auxiliary pipe 387 is a valve to decompress the operating fluid flowing in the liquefaction auxiliary system pipe 387 (for example, to an extent of 1 atm) and to decrease temperature (for example to an extent of −42° C.).

The forward-side liquefaction auxiliary pipe 388 penetrates in the forward-side heat-insulating expansion chamber 12 and a lower stream end portion thereof is joined with the backward-side liquefaction auxiliary pipe 389 at a joining portion 390 and connected to an inlet 317a of a liquefaction auxiliary system liquefaction pump 317.

Further, on halfway of the forward-side liquefaction auxiliary pipe 388 corresponding to a penetration portion of the forward-side heat-insulating expansion chamber 12, similar to the electricity generation system B, the heat exchange unit 388a is formed and it is constituted so that liquefaction of the operating fluid in the forward-side heat-insulating expansion chamber 12 is assisted by cooled operating liquid flowing in the forward-side liquefaction auxiliary pipe 388. That is, most of operating fluid introduced in the forward-side heat-insulating expansion chamber 12 is liquefied by adiabatic expansion, on the other hand, auxiliary liquefaction of gas phase operating fluid not reaching liquefaction in spite of temperature decreasing by adiabatic expansion is further conducted, thereby it is constituted that substantial whole quantity of the operating fluid can be liquefied.

The backward-side liquefaction auxiliary pipe 389 has the constitution as same as that of the forward-side liquefaction auxiliary pipe 388. The backward-side liquefaction auxiliary pipe 389 penetrates in the backward-side heat-insulating expansion chamber 13 and a lower stream portion thereof is joined at the joining portion 390. Further, the heat exchange unit 389a is formed at the penetration portion of the backward-side heat-insulating expansion chamber 13 and it is constituted that the operating fluid liquefaction in the backward-side expansion chamber 13 is assisted.

The operating fluid compressed by the liquefaction auxiliary system liquefaction pump 317 is ejected from an outlet 317b and is condensed and liquefied in the liquefaction auxiliary system condenser 332, thereafter is joined with the operating fluid flowing in the circulation pump reflux pipe 25 by a joining pump 328a at the joining portion 325a through a liquefaction auxiliary system compression liquid sending pipe 328. As one example, the liquefaction auxiliary system liquefaction pump 317 is driven and controlled by the control unit 3 so that the operating fluid pressure in a liquefaction auxiliary system pipe 487 is maintained to about 1 atm and supplies the operating fluid to the liquefaction auxiliary system compression liquid sending pipe 328 while pressure of the operating fluid is made to an extent of 4 atm by compression. Further, the pressure of operating fluid is increased to about 9 atm from about 4 atm by the joining pump 328a, thereafter the operating fluid is joined with the circulation pump reflux pipe 25. Similar operation is conducted in the cooling system liquefaction pump 318 and the joining pump 329a.

According to the electricity generation system C having constitution mentioned in the above, it can be constructed the power generation system and the electricity generation system using the power generation system through which efficient electricity generation can be conducted.

Figure 7:
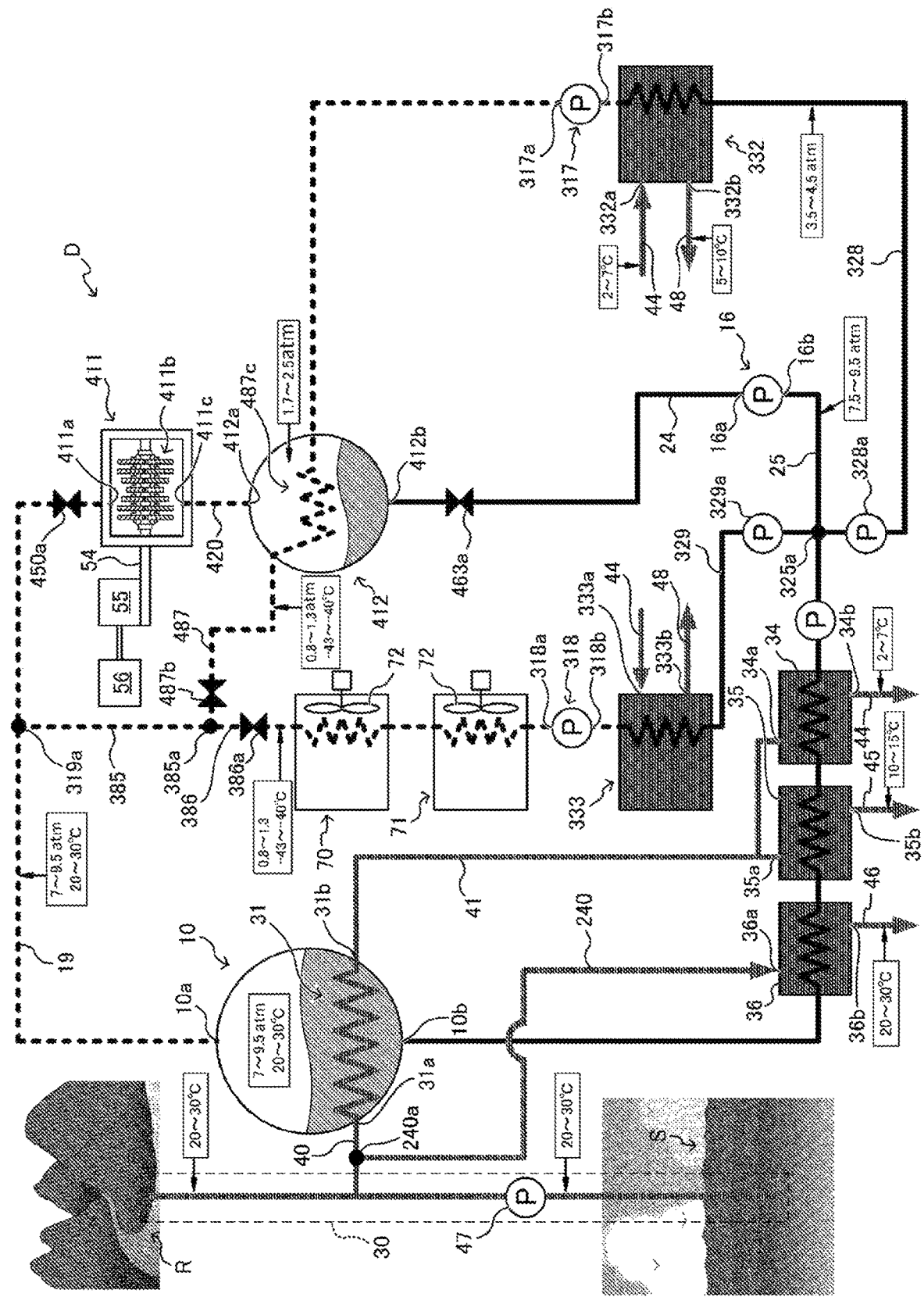
FIG. 7 is an explanatory view indicating a constitution of the electricity generation system according to the fourth embodiment.

Next, an electricity generation system D according to the fourth embodiment will be described with reference to FIG. 7. Here, pressure and temperature enclosed by a square will be guide temperature and guide pressure in a portion indicated by an arrow.

The electricity generation system D has the constitution as same as that of the electricity generation system A~ the electricity generation system C. Especially, the electricity generation system D has the constitution as same as that of the electricity generation system C. However, the electricity generation system D is mainly different at the following points in constitution.

a turbine 411b is utilized instead of the heat-insulating reciprocal cylinder 11, and the heat-insulating expansion chamber is one.

Each constitution will be concretely described. First, in the electricity generation system D, a downstream end portion of the operating fluid gas sending pipe 19 is connected to an inlet 411a of a turbine chamber 411, thereby the turbine 411b is made rotatable. Thereby, a shaft of the turbine 411b functions as output section of power and produced power is used as rotational power, as a result, continuous electricity generation can be done. Here, sign 450a is a control valve to adjust quantity of the operating fluid supplied to the turbine chamber 411.

The operating fluid supplied to the turbine chamber 411 is discharged from a forward-side outlet 411c and introduced in a heat-insulating expansion chamber 412 from an expansion chamber inlet 412a through a operating fluid gas discharge pipe 420.

On the other hand, the liquefaction auxiliary system pipe 487 is branched from the third branch portion 385a of the cooling pipe 385 and the liquefaction auxiliary system pipe 487 penetrates in the heat-insulating expansion chamber 412. A downstream end portion thereof is connected to the inlet 317a of the liquefaction auxiliary system liquefaction pipe 317. Here, a decompression valve 487b provided in the liquefaction auxiliary system pipe 487 is a valve to decompress the operating fluid flowing in the liquefaction auxiliary system pipe 487 and to decrease temperature thereof.

Further, on half way of liquefaction auxiliary system pipe 487 corresponding to penetration portion of the heat-insulating expansion chamber 412, similar to the electricity generation system C, a heat exchange unit 487c is formed and it is constituted so that liquefaction of the operating fluid in the heat-insulating expansion chamber 412 is assisted through cooled operating fluid flowing in the liquefaction auxiliary system pipe 487.

Therefore, the operating fluid introduced in the heat-insulating expansion chamber 412 though the expansion chamber inlet 412a is firmly liquefied by temperature decrease through heat-insulating expansion and cooling through the heat exchange unit 487c.

The operating fluid liquefied in the heat-insulating expansion chamber 412 is supplied to the inlet 16a of the circulation pump 16 through the circulation pump supply pipe 24 from an operating fluid outlet 412b and refluxed to the evaporation chamber 10.

According to the electricity generation system having the constitution mentioned in the above, it can be constructed the power generation system and the electricity generation system using the power generation system through which efficient electricity generation can be conducted.

Further, especially, since the electricity generation system D adopts the turbine 411b as electromotive means, there is a merit that continuous electricity generation can be conducted.

Application examples of the electricity generation system A~D according to the embodiments will be mentioned. Although in the embodiments mentioned in the above it is described examples in which seawater of predetermined temperature is utilized as supply medium of foreign heat energy, various applications can be done by making the foreign heat energy supply medium to the other medium other than seawater and installing the electricity generation system A~D itself in a specific place.

(1. The Electricity Generation System A~D as Ancillary Equipment of Power Plant)

It can be constructed complex power structure of the electricity generation system A~D and a power plant by accompanying a power plant in which cooling water is used and hot drainage is discharged such as thermal power plant, nuclear power plant, geothermal power plant and the like.

In this case, by using hot drainage discharged from the power plant as the foreign heat energy supply medium, electric power can be further supplied in addition to electric power produced in power plant.

(2. The Electricity Generation System A~D as Ancillary Equipment of Ship)

The electricity generation system A~D may be accompanied to a ship. Especially, since the ship sails at sea isolated from energy supply facility on land such as power plant and the like, it is extremely important task to efficiently utilize energy.

At that point, in a case that the electricity generation system A~D is accompanied to the ship, it can be attempted use efficiency of energy in the ship.

In this case, it can be conducted efficient electricity generation by using seawater as foreign heat energy supply medium, utilizing as ship propulsion energy and using hot drainage utilized for cooling of internal combustion engine of the ship.

Further, in particular, in the electricity generation system A~D, as mentioned in the above, it can be provided the freezer compartment and the cold room. Therefore, it is of course useful for storage of food and the like in the ship and great contribution can be brought for construction of refrigerator ship.

As mentioned in the above, the power generation system (for example, electricity generation system A D) is constituted so that;

A power generation system for generating power by circulating operating fluid (for example, propane) within a system of pressure-resistant closed circuit (for example, pressure-resistant closed circuit 1) while changing state of the operating fluid and converting foreign heat energy given to the operating fluid into kinetic energy, wherein the pressure-resistant closed circuit comprising:

an evaporation chamber (for example, evaporation chamber 10)

in which gas phase (for example, propane gas) and liquid phase (for example, liquefied propane) of the operating fluid are stored at a temperature near a boiling point and which is constituted so as to be capable of heat exchange between heating fluid (for example, seawater) supplied from outside a system of the pressure-resistant closed circuit and gas phase of the operating fluid;

a reciprocal heat-insulating cylinder (for example, heat-insulating reciprocal cylinder 11) having a piston (for example, piston 53) moving by pressure difference between a forward-side expansion room (for example, forward-side expansion room 11e) and a backward-side expansion room (for example, backward-side expansion room 11f) and a rod (for example, rod 54) extended from the piston, the rod outputting power;

operating fluid supply and discharge means (for example, control unit 3) for conducting supply channel forming operation to form a channel for supplying the operating fluid in a gas phase portion in the evaporation chamber to one of expansion rooms of the reciprocal heat-insulating cylinder and discharge channel forming operation to form a discharge channel of the operating fluid from another expansion room, further for alternately conducting the supply channel forming operation and the discharge channel forming operation against the forward-side expansion room and the backward-side expansion room;

a heat-insulating expansion chamber for liquefying the operating fluid discharged from the another expansion room by temperature decrease according to adiabatic expansion; and a liquefied operating fluid reflux means (for example, circulation pump 16) for refluxing the operating fluid liquefied in the heat-insulating expansion chamber to the evaporation chamber. Therefore, it can be provided the power generation system through which efficient power generation can be conducted in comparison with the conventional technology.

Further, the power generation system (for example, electricity generation system D) is constituted so that;

A power generation system (for example, electricity generation system) for generating power by circulating operating fluid within a system of pressure-resistant closed circuit while changing state of the operating fluid and converting foreign heat energy given to the operating fluid into kinetic energy, wherein the pressure-resistant closed circuit comprising:

an evaporation chamber in which gas phase and liquid phase of the operating fluid are stored at a temperature near a boiling point and which is constituted so as to be capable of heat exchange between heating fluid supplied from outside a system of the pressure-resistant closed circuit and gas phase of the operating fluid;

an energy transmission mechanism having a turbine (for example, turbine 411b) rotating based on pressure difference between pressure of the evaporation chamber side and pressure of the heat-insulating expansion chamber side and a rod (for example rod 54) extended from the turbine and outputting power;

a liquefied operating fluid reflux means in which a channel from the evaporation chamber to the turbine is bifurcated on halfway thereof and one thereof is made as energy recover channel (for example, liquefaction auxiliary system) and the other thereof is made as a cooling circuit (for example, cooling facility cooling system), further condensed heat of the operating fluid flowing in the heat-insulating expansion chamber is recovered and the operating fluid is liquefied and thereafter refluxed to the evaporation chamber by arranging the cooling heat exchanger constituting a part of the cooling circuit within the expansion chamber of the energy recover circuit;

a compression liquefaction reflux means for compressing and liquefying the operating fluid after the condense heat is recovered in the cooling heat exchanger of the cooling circuit and for refluxing the operating fluid to the evaporation chamber. Therefore, it can be provided the power generation system through which efficient power generation can be conducted in comparison with the conventional technology.

Finally, explanation of each embodiment mentioned in the above indicates one example of the present invention and the present invention is not limited to the embodiments mentioned in the above. Therefore, other than each embodiment mentioned in the above, various modifications can be, of course, conducted within a scope not deviating the technical concept according to the present invention, corresponding to design plan.

For example, needless to say, the constitution in any power generation system among the electricity generation systems A~D may be adopted as the other electricity generation system within a scope not hindering the objective function.

REFERENCE SIGNS 1 pressure-resistant closed circuit
2 heat exchange mechanism
3 control unit
10 evaporation chamber
11 heat-insulating reciprocal cylinder
11e forward-side expansion room
11f backward-side expansion room
12 forward-side heat-insulating expansion chamber
13 backward-side heat-insulating expansion chamber
16 circulation pump
17 forward-side liquefaction pump
18 backward-side liquefaction pump
25 circulation pump reflux pipe
26 forward-side gas phase sending pipe
27 backward-side gas phase sending pipe
28 forward-side compression liquid sending pipe
29 backward-side compression liquid sending pipe
32 forward-side condenser
33 backward-side condenser
34 first warming heat exchanger
35 second warming heat exchanger
36 third warming heat exchanger
50a, 50b supply valve
53 piston
54 rod
56 generator
60a, 60b discharge valve
65, 65 gas phase supply valve
70 freezer compartment
71 cold room
A electricity generation system

The invention claimed is:

1. A power generation system for generating power by circulating operating fluid within a system of pressure-resistant closed circuit while changing state of the operating fluid and converting foreign heat energy given to the operating fluid into kinetic energy, wherein the pressure-resistant closed circuit comprising:

an evaporation chamber in which gas phase and liquid phase of the operating fluid are stored at a temperature near a boiling point and which is constituted so as to be capable of heat exchange between heating fluid supplied from outside a system of the pressure-resistant closed circuit and the liquid phase of the operating fluid;

a reciprocal heat-insulating cylinder having a piston moving by pressure difference between a forward-side expansion room and a backward-side expansion room and a rod extended from the piston, the rod outputting power;

operating fluid supply and discharge means for conducting supply channel forming operation to form a channel for supplying the operating fluid in the gas phase portion in the evaporation chamber to one of expansion rooms of the reciprocal heat-insulating cylinder and discharge channel forming operation to form a discharge channel of the operating fluid from another expansion room, further for alternately conducting the supply channel forming operation and the discharge channel forming operation against the forward-side expansion room and the backward-side expansion room;
a heat-insulating expansion chamber for liquefying the operating fluid discharged from the another expansion room by temperature decrease according to adiabatic expansion; and
a liquefied operating fluid reflux means for refluxing the operating fluid liquefied in the heat-insulating expansion chamber to the evaporation chamber.

2. The power generation system according to claim 1, further comprising compression liquefaction reflux means for compressing and liquefying remainder of the operating fluid not liquefied in the heat-insulating expansion chamber and refluxing the operating fluid to the evaporation chamber.

3. The power generation system according to claim 2, wherein the heat-insulating expansion independently provided for each of both a downstream side of the discharge channel of the forward-side expansion room and a downstream side of the discharge channel of the backward-side expansion room.

4. The power generation system according to claim 3, wherein an operating fluid channel communicating the gas phase portion of each heat-insulating expansion chamber and the compression liquefaction reflux means penetrates in the another heat-insulating expansion chamber and a heat exchange unit to promote liquefaction of the operating fluid discharged from the expansion room is respectively provided on the penetrated operating fluid channel.

5. The power generation system according to claim 2, wherein the pressure resistant closed circuit further has an on-off valve provided on halfway of the operating fluid channel communicating the gas phase portion of the heat-insulating expansion chamber and the compression liquefaction reflux means, and
wherein the operating fluid supply discharge means conducts decompression sending operation in which the supply and discharge channel of the operating fluid to the expansion room is temporarily closed at a change time of reciprocal motion of the rod and the operating fluid is introduced to the compression liquefaction reflux means while the on-off valve is opened and a temperature is decreased by further adiabatically expanding the gas phase portion in the heat-insulating expansion chamber.

6. The power generation system according to claim 5, wherein the operating fluid is gas under normal temperature and pressure and a cold or freezer facility using the operating fluid as refrigerant is provided between the on-off valve and the compression liquefaction reflux means.

7. The power generation system according to claim 2, wherein the pressure-resistant closed circuit has a condenser condensing the operating fluid by conducting heat exchange with cooling fluid supplied from outside a system of the pressure-resistant closed circuit, the condenser being provided on halfway of the operating fluid channel communicating the compression liquefaction reflux means and the evaporation chamber.

8. The power generation system according to claim 7, wherein the cooling fluid is the heating fluid after heat exchange is conducted in the evaporation chamber.

9. The power generation system according to claim 1, wherein in the pressure-resistant closed circuit a plurality of warming heat exchangers warming the operating fluid by conducting heat exchange with warming fluid supplied from outside a system of the pressure-resistant closed circuit are provided in series, the warming heat exchanger being provided on halfway of the operating fluid channel communicating the compression liquefaction reflux means and the evaporation chamber.

10. The power generation system according to claim 7, wherein in the pressure-resistant closed circuit a plurality of warming heat exchangers warming the operating fluid by conducting heat exchange with the warming fluid supplied from outside a system of the pressure-resistant closed circuit are provided in series, the warming heat exchanger being provided on halfway of the operating fluid channel communicating the compression liquefaction reflux means and the evaporation chamber, and
wherein the warming fluid supplied in the heat exchanger of last stage among the warming heat exchangers provided in series is the cooling fluid after heat exchange is conducted in the condenser.

11. The power generation system according to claim 10, wherein the operating fluid condensed in the condenser is joined with the liquefied operating fluid refluxed to the evaporation chamber through the liquefied operating fluid reflux means on halfway of the operating fluid channel arranged upstream side than the warming heat exchanger and downstream side than the liquefied operating fluid reflux means.

12. The power generation system according to claim 7, wherein in the pressure-resistant closed circuit a plurality of warming heat exchangers warming the operating fluid by conducting heat exchange with the warming fluid supplied from outside a system of the pressure-resistant closed circuit are provided in series, the warming heat exchanger being provided on halfway of the operating fluid channel communicating the compression liquefaction reflux means and the evaporation chamber, and
wherein discharged liquid of the warming fluid supplied in the heat exchanger of first stage among the warming heat exchangers provided in series is supplied to the condenser as the cooling fluid.

13. The power generation system according to claim 12, wherein the warming fluid supplied to the heat exchanger of last stage among the heat exchangers provided in series is a part of the heating fluid inflowing therein, to conduct heat exchange with liquid phase of the operating fluid in the evaporation chamber.

14. The power generation system according to claim 1, wherein in the heat-insulating expansion chamber an auxiliary heat exchanger assisting liquefaction of the operating fluid is arranged at a position contactable with the operating fluid introduced from the another expansion room, and
wherein the operating fluid diverted from halfway of the operating fluid channel communicating the evaporation chamber and the reciprocal heat-insulating cylinder is introduced in the auxiliary heat exchanger through a pressure reducing valve and the operating fluid introduced in the heat-insulating expansion chamber from the reciprocal heat-insulating cylinder is cooled and liquefaction is assisted, and
wherein the operating fluid discharged from auxiliary heat exchanger is compressed and condensed by the compression liquefaction reflux means and the operating fluid is refluxed to the evaporation chamber.

15. An electricity generation system using the power generation system described in claim 1, wherein the rod extended from the piston is connected so that power becomes transmittable to a passive part of a generator.

16. A power generation system for generating power by circulating operating fluid within a system of pressure-resistant closed circuit while changing state of the operating fluid and converting foreign heat energy given to the operating fluid into kinetic energy, wherein the pressure-resistant closed circuit comprising:
an evaporation chamber in which gas phase and liquid phase of the operating fluid are stored at a temperature near a boiling point and which is constituted so as to be capable of heat exchange between heating fluid supplied from outside a system of the pressure-resistant closed circuit and gas phase of the operating fluid;
a heat-insulating expansion chamber liquefying the operating fluid supplied from the evaporation chamber by temperature decrease according to adiabatic expansion;
a turbine rotating by contacting with the operating fluid flowing based on pressure difference between pressure of the evaporation chamber side and pressure of the heat-insulating expansion chamber side within a turbine room arranged on halfway of an operating fluid channel communicating the evaporation chamber and the heat-insulating expansion chamber;
an energy transmission mechanism having a rod extended from the turbine and outputting power;
a liquefied operating fluid reflux means for refluxing the operating fluid liquefied in the heat-insulating expansion chamber to the evaporation chamber; and
an auxiliary heat exchanger assisting liquefaction of the operating fluid, the auxiliary heat exchanger being arranged at a position contactable with the operating fluid introduced from the turbine room;
wherein the operating fluid diverted from halfway of the operating fluid channel communicating the evaporation chamber and the turbine room is introduced in the auxiliary heat exchanger through a pressure reducing valve and the operating fluid introduced in the heat-insulating expansion chamber from the turbine room is cooled and liquefaction is assisted, and
wherein the operating fluid discharged from the auxiliary heat exchanger is compressed and condensed by the compression liquefaction reflux means and the operating fluid is refluxed to the evaporation chamber.

17. The power generation system according to claim 16, wherein the pressure-resistant closed circuit has a condenser condensing the operating fluid by conducting heat exchange with cooling fluid supplied from outside a system of the pressure-resistant closed circuit, the condenser being provided on halfway of the operating fluid channel communicating the compression liquefaction reflux means and the evaporation chamber.

18. The power generation system according to claim 17, wherein in the pressure-resistant closed circuit a plurality of warming heat exchangers heating the operating fluid by conducting heat exchange with warming fluid supplied from outside a system of the pressure-resistant closed circuit are provided in series, the warming heat exchanger being provided on halfway of the operating fluid channel communicating the compression liquefaction reflux means and the evaporation chamber, and wherein discharged liquid of the warming fluid supplied in the heat exchanger of first stage among the warming heat exchangers provided in series is supplied to the condenser as the cooling fluid.

19. The power generation system according to claim 18, wherein the warming fluid supplied to the heat exchanger of last stage among the heat exchangers provided in series is a part of the heating fluid inflowing therein, to conduct heat exchange with liquid phase of the operating fluid in the evaporation chamber.

20. An electricity generation system using the power generation system described in claim 16, wherein the rod extended from the piston is connected so that power becomes transmittable to a passive part of a generator.

* * * * *